United States Patent
Lavallee et al.

(10) Patent No.: US 10,181,003 B1
(45) Date of Patent: Jan. 15, 2019

(54) PROCESSING CIRCUITS FOR PARALLEL ASYNCHRONOUS MODELING AND EXECUTION

(71) Applicant: You Know Solutions, LLC, Belgrade, ME (US)

(72) Inventors: Ronald J. Lavallee, Belgrade, ME (US); Thomas C. Peacock, Bedford, NH (US)

(73) Assignee: YOU KNOW SOLUTIONS, LLC, Belgrade, ME (US)

( * ) Notice: Subject to any disclaimer, the term of this patent is extended or adjusted under 35 U.S.C. 154(b) by 0 days.

(21) Appl. No.: 15/994,029

(22) Filed: May 31, 2018

Related U.S. Application Data

(60) Provisional application No. 62/618,865, filed on Jan. 18, 2018.

(51) Int. Cl.
*G06F 17/50* (2006.01)

(52) U.S. Cl.
CPC ...... *G06F 17/5059* (2013.01); *G06F 17/5054* (2013.01); *G06F 2217/02* (2013.01)

(58) Field of Classification Search
CPC .................................................. G06F 17/5059
USPC ........................................................ 716/101
See application file for complete search history.

(56) References Cited

U.S. PATENT DOCUMENTS

| | | | | |
|---|---|---|---|---|
| 6,044,211 A | * | 3/2000 | Jain | G06F 9/4498 716/102 |
| 8,887,121 B2 | * | 11/2014 | Ravindran | G06F 8/34 716/139 |
| 8,949,806 B1 | * | 2/2015 | Lee | G06F 8/445 711/170 |
| 9,003,383 B2 | | 4/2015 | Lavallee et al. | |
| 9,411,558 B2 | | 8/2016 | Hutchison | |
| 2008/0082786 A1 | * | 4/2008 | Lovell | G06F 15/76 712/15 |
| 2009/0013307 A1 | * | 1/2009 | Raghavan | G06F 17/5009 717/106 |
| 2018/0181582 A1 | * | 6/2018 | Keymolen | G06F 9/4881 |

* cited by examiner

*Primary Examiner* — Suresh Memula
(74) *Attorney, Agent, or Firm* — Hayes Soloway PC

(57) ABSTRACT

Devices, systems, and methods are disclosed that are configured to execute functions using synthesized parallel stateless asynchronous flowcharts. The flowcharts include one or more test objects, action objects, and/or task objects. Each of the objects in the flowcharts to be executed sets out an atomic path, which is a sequence of functions with one or more elements. The disclosed processing circuits are configured to execute the functions/instructions set forth in the flowcharts by following each atomic path. In some embodiments, the processing circuits execute the one or more flowcharts in an order determined during processing (i.e., "on the fly"). In these and other embodiments, the disclosed processing circuits transform or restore elements of the one or more flowcharts with or without human intervention.

23 Claims, 41 Drawing Sheets

Enable Block Circuits

Action Block Circuits

Wait Block Circuits

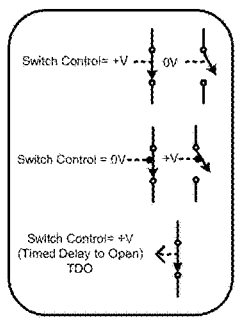

Action Block Circuit Description

Consider each symbol as a simple switch that is either ON or OFF dependent on the voltage (0V or +V) applied to the Control terminal.

At Power ON the source block input will be at 0V. When the source block input turns ON Sw-1 will close (ON) thereby applying +V thru Sw-2, a Timed Delay to Open switch, that generates the Block Action Pulse that drives all of the Atomic Functions that are controlled by this block.

The Computational Wave Flow to the next block (Block Output) will remain ON until Sw-1 turns OFF. Turning OFF Sw-1 will remove +V from From the Block Output.

A Freeze Control function is not used by Action Blocks

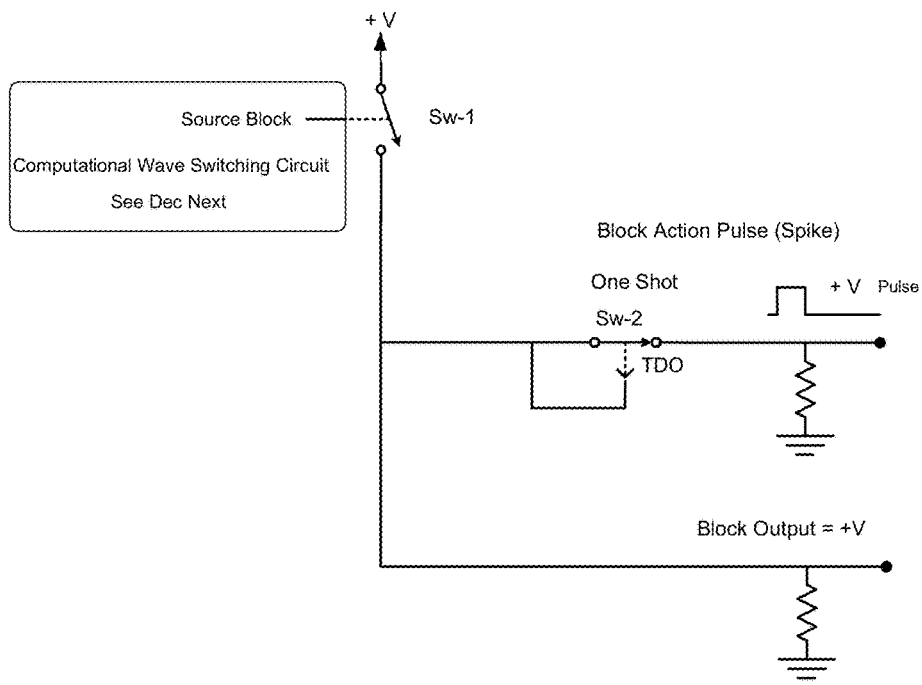

FIG. 8

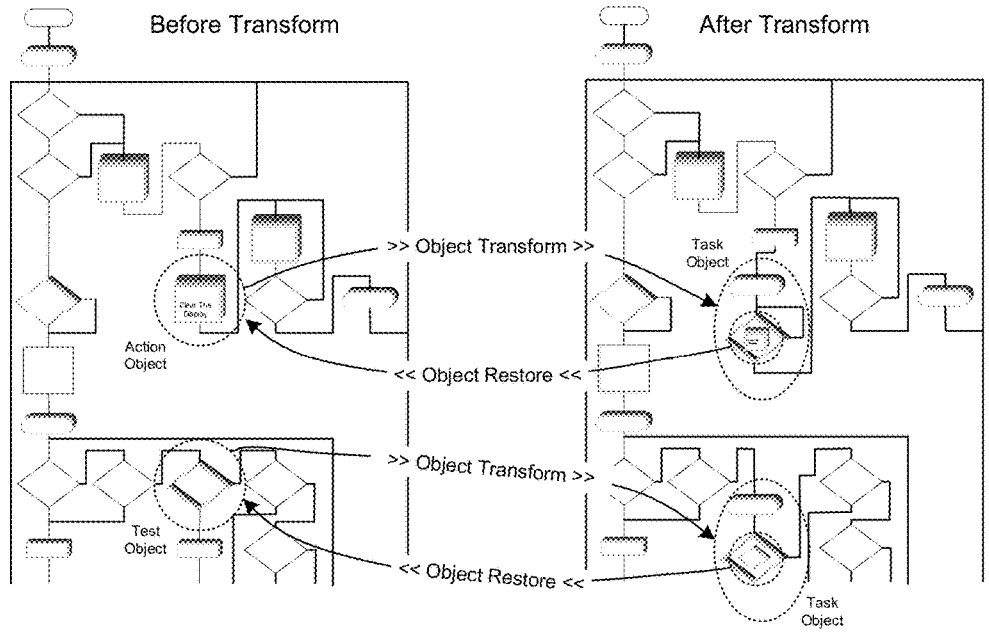

A Flowpro Machine Transform Engine converts and restores all Flowpro Machine 'Recall' Element hardware, software and visualization into Flowpro Machine 'Reason' Element hardware, software and visualization by human intent or by machine using enumerated Flowpro Machine Atomic Time values.

Atomic Time is equivalent to an instant.

Recall Elements are Action or Test Objects and always execute in an instant or less and <u>cannot</u> contain Loop Back structures.

A Reason Element is a Task Object and <u>can</u> take longer than instant to execute and can contain Loop Back structures.

Flowpro Machine Structure $$\Leftrightarrow \sum_{k=1}^{n}\{\Phi\} \cup \{R_k, S_k : \exists R \in S \land \exists f(S) \in R \land \nexists S \in R\}$$

$\Phi$ (Data), $R_k$ (Recall Object), $S_k$ (Reasoned Object)

FIG. 14

Bit is ON
Geo Task

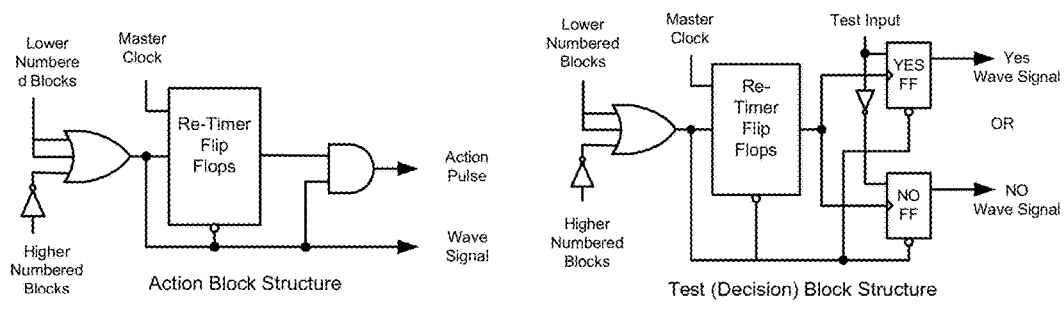
"FC_1_V5" Block Input Structure
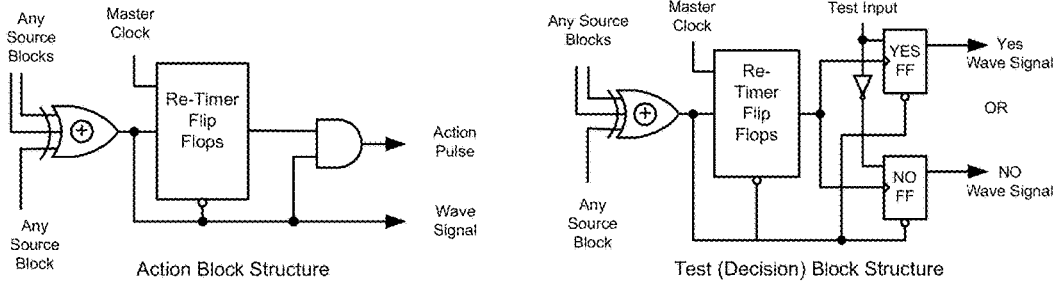
Future Flowpro Machine Block Input Structure
FIG. 25

FC_1_V5 Flowpro Machine

PROCESSING CIRCUITS FOR PARALLEL ASYNCHRONOUS MODELING AND EXECUTION

CROSS REFERENCE TO RELATED APPLICATION

This application claims priority from U.S. Provisional Application Ser. No. 62/618,865, filed Jan. 18, 2018, the contents of which is incorporated by reference herein.

BACKGROUND

Amongst the computational models that are in use today, a Turing Machine model is the most powerful, but cannot be directly implemented in an Integrated Circuit (i.e., a Chip). In order to execute a Turing Machine Model, it must first be translated to State Machines and Combinatorial Logic models which are then realized using the transistors in the chip. While a Turing Machine is a model of computation, State Machines and Combinatorial Logic are the execution intelligence of a Turing Machine. Embedded within software is a model that represents the overall function of the software and another underneath that represents the execution model of the device that will be executing the software. Each of these models has multiple methodologies to express the model's intent so experts in each model are generally employed in a project.

On one end of the spectrum, the human side, this knowledge is contained in many written pages and many lines of different computer code. Eventually, this human knowledge is translated for the other end of the spectrum, the hardware, the Chip. On the hardware side, the human-conceived domain knowledge and software language models must be translated into execution knowledge. The execution intelligence is then used to assemble billions of transistors into a form that models human-based knowledge.

Transferring human knowledge to machine knowledge requires that the human knowledge first be assembled into a form that can be translated to machine execution knowledge. A primary function of computer software is to assemble the human intelligence into a form that is transferable to a computational machine, a chip, for execution. In most cases the software-assembled intelligence is translated into computational intelligence that a Turing machine (a computer) will execute. A Turing Machine is a programmable model of computation that executes human knowledge and is implemented in a Chip as a pre-assembled, fixed configuration of transistors. Software languages that program a Turing Machine, such as C, C++, Java, Verilog, HDL, MATLAB, Simulink, etc. are a bridge between a human and a machine that are used for the transfer of human-conceived knowledge to a machine.

A cell phone is a Turing Machine device that will be reprogrammed many times while the device is being developed. Reprogramming is necessary because the requirements of the device's behavior change and primarily because 'bugs' are found and must be corrected. Bugs are mistakes in the conceived knowledge, transferred knowledge, or the execution knowledge (for instance, wrong home screen color, up gesture causes screen to scroll down, network connection problems, etc.). In a complex device such as a cell phone, finding these bugs and fixing them can be very difficult. Translating from one model to another and maintaining all the original knowledge contributes to these bugs and can be even more difficult to find and correct. Because of this, extensive simulation of both software and hardware is part of a Chip Design Flow. Simulation introduces another level of model translation and the potential for additional bugs. A design flow that uses a consistent model would be preferable to the current design approach.

SUMMARY

Various devices, systems, and methods are disclosed herein to facilitate the design and production of asynchronous hardware to execution functions of one or more flowcharts in parallel. The current state of asynchronous design, or clock-less design, has remained relatively constant for the last 25 years. During the 1990s, asynchronous design enjoyed significant research focus for the purpose of reducing power and potentially increasing processor speed. In 1997, Intel developed an asynchronous Pentium processor that was three times faster and consumed half the power of a standard Pentium processor. Yet even with these speed and power advantages, asynchronous chip design has not caught on, in part, due to costs associated with design and debugging. It was estimated that it would take five times as long to get an asynchronous chip to market versus a synchronous design chip. This is due to the fact that, until now, it has been too difficult to use asynchronous design and debug. The disclosed devices, systems, and methods address both these issues by providing an easy design methodology with numerous development and debugging tools.

Presently, all state-of-the-art asynchronous design solutions are timing models similar to synchronous models, albeit without a master clock signal. All of these models are implemented in a substrate (Chip) using Boolean and State Machine structures. A Turing Machine computation is an evolution of 'States' (steps) and the Boolean and State Machines performing the computation must know when a 'State' is valid. Synchronous designs include a master clock signal which provides the capability to know when a State is valid. This makes the design of the implemented circuits much easier because there is time to propagate logic signals. For these design reasons and with mature design and debug tools, synchronous design is commonplace even though master clock distribution throughout complex chips can be challenging.

Asynchronous designs mimic synchronous designs, in some respects, but do not include a master clock to indicate when a State is valid. Designers must pay careful attention to signal propagation delays and they need to know when a State step has completed. They do this usually by providing an acknowledgment, signal for a State step. Various methods have been used to implement State acknowledgment including multiple signals for request, acknowledge schemes, and some involving multiple threshold levels, all of which adds to the complexity of current asynchronous design methodologies.

Current asynchronous models also suffer because they are based on a timing model but attempt to implement as an event model with a request-acknowledge signal structure. This works but it is more complex to design and more hardware-intensive to implement. A simpler approach would be to design with an asynchronous event model and implement as an asynchronous event model. The presently disclosed devices, systems, and methods, at times referred to herein as "Flowpro Machines" utilize this approach.

The presently disclosed Flowpro Machine design model is a parallel asynchronous Stateless event model and a Flowpro Machine implementation model is also an event model A Flowpro Machine Computation is an evolution of events (not States) that determines a computation. The process of asynchronous design may now involve drawing parallel asynchronous flowcharts of a process, synthesizing those flowcharts to Action, Test and Task Object flowchart devices, and downloading those devices to a substrate for execution as parallel asynchronous flowcharts.

BRIEF DESCRIPTION OF THE DRAWINGS

FIG. 7A illustrates a human-conceived Flowpro Machine, FIG. 7B illustrates an FPGA hardware Flowpro Machine, and FIG. 7C illustrates a Flowpro Machine with ideal hardware for the disclosed flowchart.

FIG. 7E shows action block circuits, FIG. 7F shows test block circuits, FIG. 7G shows wait block circuits, FIG. 7H shows task object concepts, and FIG. 7I shows computational wave switching control circuits.

FIG. 8 is an illustration of an atomic action block operating concept, in accordance with an exemplary embodiment of the disclosure.

FIG. 14 is a Flowpro Machine Object Transform Engine, in accordance with an exemplary embodiment of the disclosure.

FIG. 25 is an illustration of exemplary atomic block general structures, in accordance with an exemplary embodiment of the disclosure.

DETAILED DESCRIPTION

Figure 1A:
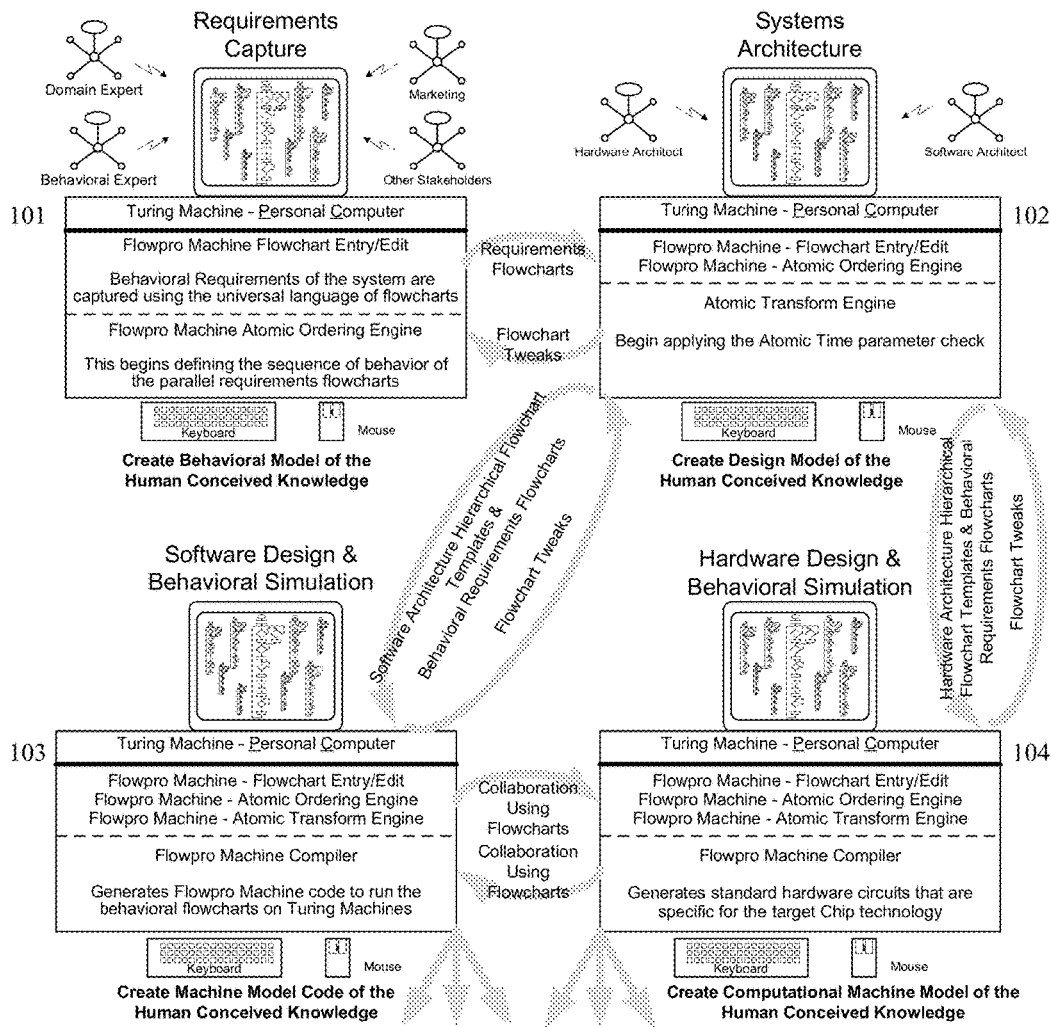
FIGS. 1A-1B show a block diagram of an exemplary processing circuit (also referred to herein as a Flowpro Machine Computational Engine), in accordance with a first exemplary embodiment of the present disclosure.

Both Flowpro Machines and the state-of-the-art (SOA) asynchronous design methodology provide a power advantage over a synchronous design methodology. For example, a synchronous design is always toggling at least a portion of the transistors that are used in its implementation, consuming considerable power. An SOA asynchronous design only toggles transistors when needed, which results in less power consumption even though extra signals are added to implement asynchronous methods. A Flowpro Machine consumes even less power because extra signals are not needed to implement the asynchronous method. A Flowpro Machine is a simpler more straightforward asynchronous design and consumes less power than SOA asynchronous designs. There isn't the need for propagation delay analysis or the addition of request-acknowledge signals and only the Flowpro Machines that are 'Enabled' (active) are toggling transistors.

Processes designed and executed with Flowpro Machines may run faster than the same process designed and executed with SOA synchronous machines. The reason is that, at least in part, Flowpro Machines are never waiting for a 'State' valid signal and are always running at propagation delay speed. Additionally, Flowpro troubleshooting tools and troubleshooting techniques are relatively straightforward.
Select Exemplary Embodiment An exemplary embodiment of the disclosed devices/systems/methods is provided in the following paragraphs for illustrative purposes. In particular, this exemplary embodiment describes a scenario in which the disclosed subject matter could be used to facilitate production of hardware to accomplish particular desired functionality. In this embodiment, stakeholders create a list of project feature requirements and then create or reuse functional (high-level) flowcharts based on the list of project feature requirements. These functional, high-level flowcharts are made up of Action, Test, and/or Task objects organized in a hierarchical arrangement to model the behaviors of the project feature requirements. The stakeholders (with or without project architects) then refine the functional, high-level flowcharts to model the desired behaviors within architectural constraints. In some embodiments, the architectural constraints are determined by the physical substrate chosen to execute the project's functionality since the substrate selected will set limiting values of the atomic time parameter for the project. The hardware is then further refined and a determination of whether a Turing machine processor will be utilized along with substrate Flowpro Machines. Project Architects create functional and architecturally-accurate Flowpro Machine flowcharts that are divided into groups of Turing processors or substrate Flowpro Machines by execution speed calculations. Throughput calculations utilizing the appropriate Atomic Time parameter for the selected substrate can be determined for Flowpro Machines running as both substrate Flowpro Machines or as Flowpro Machine simulations on Turing Machines. These Architectural behavioral flowcharts are linked by hierarchy of Action, Test and Task Objects to the highest level Functional Flowchart Action, Test and Task Objects.

Project Designers further develop the Architectural Behavioral flowcharts into Detail Execution flowchart Flowpro Machines for Turing and/or substrate execution Turing Machine Flowpro Detailed flowcharts are then compiled to machine code for executing and debugging on personal computers and subsequent download and execution on the embedded processor. Other language code can be imported and converted to Flowpro Machine flowcharts (e.g., using the procedure outlined in U.S. Pat. No. 94,111, 558). Other project designers may create detail Flowpro Machine flowcharts that directly manipulate substrate hardware and hardware interfaces. Designers can also choose to use existing Boolean and State Machine structures to use with Flowpro Machines. It is the project designers that would determine which flowcharts would be ordered while executing Visualization of flowchart objects as Action, Tests or Task happens at this point as the Atomic Time is adjusted to meet throughput requirements. Flowpro Machine substrate flowcharts are then synthesized for the technology that will be executing the functionality described in the flowcharts. Monitoring points can be added for monitoring the progression of any Flowpro Machine flowchart propagation, if desired. The Detail flowcharts may be linked by hierarchy of Action, Test and Task Objects, to Architectural flowcharts through Action, Test and Task Objects, to the highest level Functional Flowchart Action, Test and Task Objects.

As is evident from this exemplary embodiment, Flowpro hardware synthesis is the process of expanding all of the Flowpro Machine Action, Task and Task Objects in a Flowpro Machine Project until the expansion consists of only Flowpro Machine Atomic Blocks with Flowpro Machine Atomic Functions. Next, the synthesizer checks that each block's destination is connected to only one block and all blocks have at least one source block. The synthesizer then builds flowcharts by examining each block to determine the type of block to synthesize for, and it will synthesize each block into a form for executing on the architecture of a standard FPGA or it will synthesize each block to transistors or other switch elements determined by the project architects. Once the synthesis is complete with no errors it is downloaded to the Chip with the selected technology.

Monitoring and debug of a Flowpro Machine application allows for a consistent flowchart view of the running processes (Flowpro Machines). Navigating from the Detail Flowcharts level to the Functional Flowcharts level is therefore a simple navigation through Action, Test and Task Objects in a hierarchical fashion. The consistent flowchart view enables stakeholders and designers to collaborate and debug a system in which the code is universally understood. The synthesized Detail Flowcharts are an image of the Functional Flowcharts.

Overview of Disclosed Devices/Systems/Methods

The subject disclosure describes various exemplary devices, systems, and methods for the execution of asynchronous flowcharts in parallel In some example embodiments, one or more processing circuits are configured to execute instructions via one or more Flowpro Machines synthesizing parallel stateless asynchronous flowcharts. Each of the at least one or more Flowpro Machines nay be captured in the flowcharts and set out an atomic path. An "atomic path," as used herein refers to a sequence of functions with one or more elements. The one or more processing circuits execute the function(s) set forth in the flowcharts by following each atomic path. The atomic time to process the functions set forth in the flowcharts are variable for each atomic path.

Methods for generating processing circuits including generating hierarchical processing circuits using parallel asynchronous flowcharts are also described. In some embodiments, each flowchart comprises one or more flowchart elements, which include task objects. Each task object nay represent a Flowpro Machine. Each task object sets forth an atomic path, where the processing circuit can be configured to follow each of the atomic paths. Each atomic path has a variable atomic time, where the atomic time is the maximum time the processing circuit follows the atomic path. The processing circuit does not, in some embodiments, require a clock or states.

The term "Flowpro Machine" is used herein to reference the model of computation described in the present application and is not a trademark within the industry although the term has been used by the inventors previously to describe earlier iterations of previously disclosed computational engines.

Figure 1B:
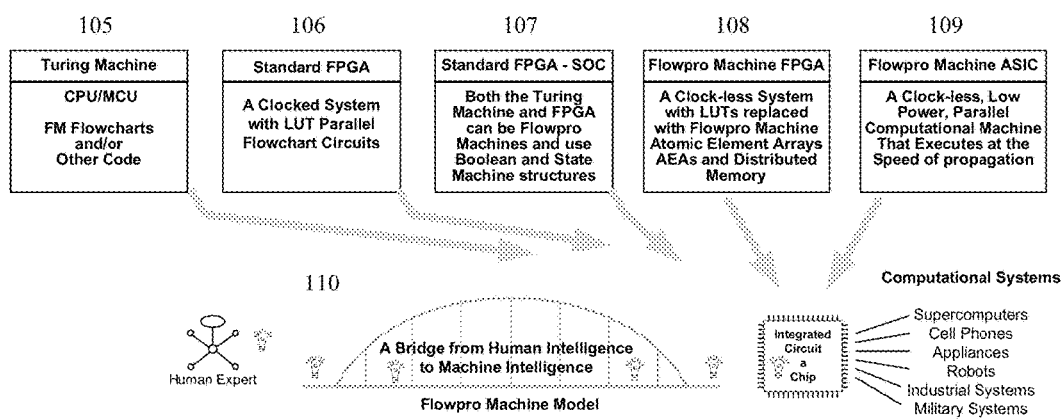

FIGS. 1A-1B show a block diagram of an exemplary processing circuit (also referred to herein as a Flowpro Machine Computational Engine), in accordance with a first exemplary embodiment of the present disclosure. In particular, FIG. 1A shows requirements capture 101 in which various stakeholders, including domain experts, behavioral experts, marketing experts, and other stakeholders use flowcharts, a universal language, to communicate intent and requirements via multiple domain specific flowcharts of the computational system (i.e. cell phone) that is to be built. The common language of Flowpro Machine flowcharts will foster a great deal of refinement at this top level of overall design and hence more accurate requirements flowcharts are passed to the System Architects 102.

The advantages to Systems Architects in using Flowpro Machines could be numerous given the flexibility of Flowpro Machines. Using the Flowpro Machine Atomic Time procedures, high-level throughput analysis of the system and individual flowcharts can be calculated, analyzed and optimize before the detailed design begins. With Flowpro Machines, Systems Architects know that they can target a Turing Machine solution 105 or a pure Flowpro Machine ASIC 109 or something in between. They also know that Flowpro machines can draw zero power when not computing and draw little power while asynchronous parallel clock-less computations are proceeding After analysis, and refinement and collaboration with the stakeholders through flowcharts, more detailed behavioral requirements flowcharts as well as architectural templates for particular targets are passed to the software and design teams 103, 104.

Flowpro machines may, in some regards, blur the lines between software design and hardware design. Behavioral flowcharts can be compiled and turned directly into transistors circuits without human intervention. Those transistors circuits, now configured as Flowpro Machines structures, can do calculations without the need for any other computational machine structures. This results in a linked traceability of Flowpro Machine Flowchart Elements from human to a machine. The design teams working with a Flowpro Machine have the added advantage that Flowpro Machines work very well with other computational machines. A simple Boolean structure output can drive the Enable Element of a Flowpro Machine, which in turn starts a sequential Flowpro process that can signal the Boolean structure that it is complete. Turing Machines can run Flowpro Machines as simulations and they will behave exactly as if they were running in a Chip, just at a slower speed. The Flowpro Machine Atomic Ordering Engine ensures that this equivalency is maintained. The Flowpro Machine Atomic Transform Engine ensures that the visualization of flowchart parallelism and throughput timing requirements coincide. This can be done before running Flowpro Machines as Turing simulations or Flowpro Machines in a Chip.

Ordering On-the-Fly (i.e., During Processing)

Both software and hardware designers can take advantage of Flowpro Machines 'ordering on the fly' capability to order any parallel executing groups of Flowpro Machines. 'Ordering on-the-fly' is a new computational technique that can be used when critical communications must take place, regardless of 'blocked' or 'starved' resource issues. The software and hardware designers can compile their Flowpro Machine flowcharts for download to one or more of the chip technologies shown in 105-109.

Clocked FPGAs

Element 105 shown in FIG. 1B is a traditional Turing Machine Chip that has been used to simulate Flowpro Machines for many years and has been shown advantages such as speed of execution. Elements 106 and 107 have the advantage that they are standard integrated circuit chips that are in high-volume production today. These Chips support Flowpro Machines and other traditional computational machines in a tightly coupled manner. A Flowpro Machine advantage in these standard FPGA's is that the Flowpro Machines remain asynchronous in execution even though standard FPGAs require a synchronous (i.e. clocked) design implementation. Flowpro Machine asynchronous execution means that only a few Flowpro Machine flowchart Elements will be switching at the same time, resulting in lower power consumption.

Massively Parallel Clock-Less Chips

Elements 108 and 109 are parallel, asynchronous, clock-less integrated circuit chips that use Flowpro Machine transistors structures (FIG. 7). Because these chips are clock-less they are very low power and execute at propagation speed. In element 108 of FIG. 1B, a Flowpro Machine FPGA has replaced the lookup tables of a standard FPGA with arrays of Flowpro Machine Atomic functions (See FIG. 3). These Atomic Element Arrays (AEAs) would also contain Action Spike hardware that generates Action Spikes that are routed throughout the Chip to other AEAs. The ASIC (element 109 in FIG. 1B) is an 'ideal' architecture Flowpro Machine that is extremely low power, secure, is an unambiguous copy of the human intent and can potentially execute more than 1 million parallel tasks.

The principal advantage of a Flowpro Machine is that the model of the knowledge is the model of execution, hence, a Flowpro Machine is its own model of computation. Humans can now use a massively parallel, simple, expressive, state-less and extremely fast executing machine to solve difficult problems. Imagine 1 billion Flowpro Machines searching for a security key in a large polynomial or as a large asynchronous neural network. Our Flowpro Machine devices mean that a Massively Parallel Computational Machine is now a reality and Moore's Law of doubling transistors every two years will continue because a Flowpro Machine is low-power, parallel and clock-less.

Figure 2A:
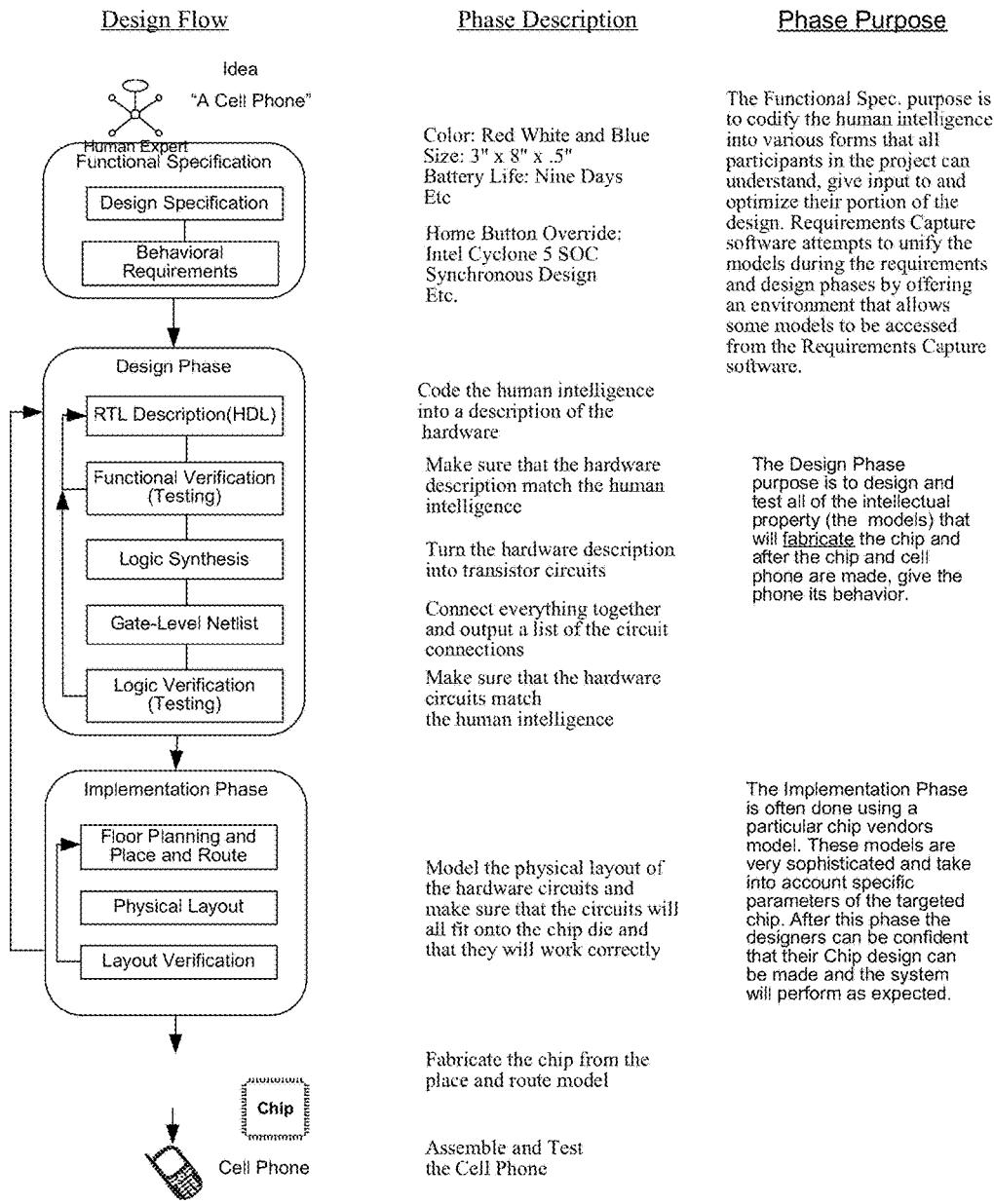
FIGS. 2A and 2B show an illustration of a design flow for a Cell Phone Machine, in accordance with an exemplary embodiment of the disclosure.
Figure 2B:
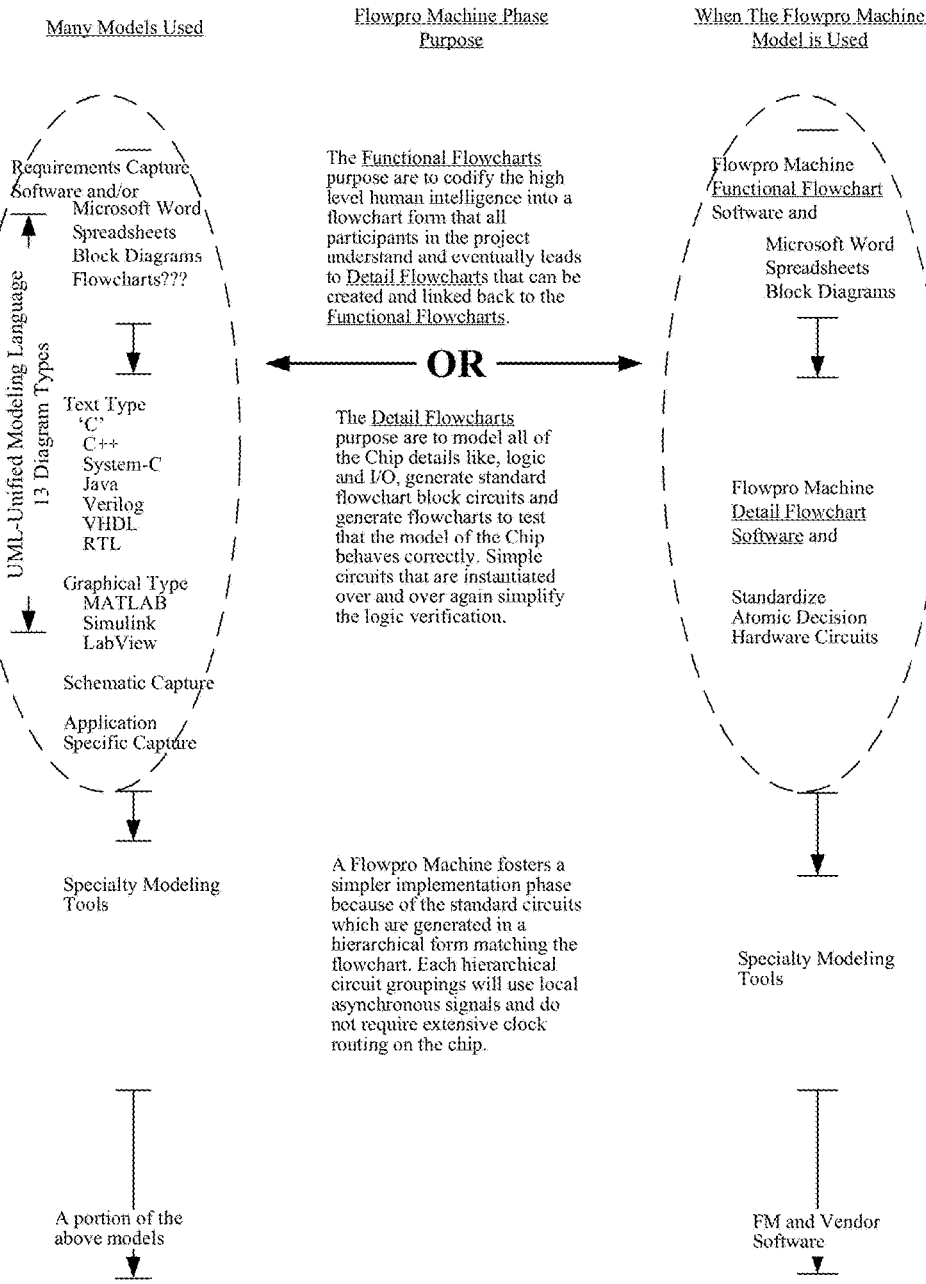

As shown in FIGS. 2A-2B, a design flow for a Cell Phone Machine or an Aircraft Carrier Machine follows approximately the same sequence but with specific customization and scale for each final product. FIG. 2A illustrates the design flow, phase description, and phase purpose of the design flow and FIG. 2B illustrates the many models currently used, the Flowpro Machine phase purpose, and an example embodiment in which the Flowpro Machine Model is used. A new machine typically begins first with a human conceived idea. That idea is captured in a Functional Specification using various models including word documents, illustrations, specialized software and project management tools. The purpose of the Functional Specification is so that the designers know what to design, the testers know what to test and the stakeholders know what they are getting.

Next, the Machine Requirements are captured in the Functional Specification model or new requirements models. Machine parameters such as how big how fast, what technology and user interactions are detailed so that the design of the machine can begin. The use of models is most prevalent during the Design Phase of a design flow. These models will vary dependent on the type of component being designed but most will be driven by software that transfers the intent of human knowledge to machine execution knowledge.

The Implementation Phase can take the intent of the human knowledge and build the machine that will execute that knowledge. Lastly, the System Testing Phase will ensure that the execution of the knowledge is the intent of the knowledge. Carrying out all or portions of the Design, Implementation, and Testing phases of a design flow in parallel is common. A consistent model for all three phases would facilitate a parallel design flow.

Chip Design Flow

The human conceived 'machine idea' that is contained in the Functional Specification is further refined to human conceived 'chip idea' and specification. The same models that are used to create a Functional Specification can continue to be used in the Chip Design Flow and new, chip specific, models will also begin to be used. The purpose of the Chip Functional Specification is so the Chip designers know what to design, the Chip testers know what to test and the Chip stakeholders, the creators of the Machine Functional Specification, know what they are getting. Requirements such as design techniques, speed, power levels, and fabrication technology are captured in this model.

The next step in the flow is creating the Behavioral Model of the chip. This model defines the architecture to be used in the chip and the functionality of the subsystems that will be used to achieve the results laid out in the Chip Functional Specification. Defining the subsystems here is important so that the interface between them is known and work on various subsystems can be done in parallel.

Once the behavioral model is done then the actual design of the top level system and the subsystems starts. This step, which is the logic design of the chip, is called the Register Transfer Level (RTL) phase. This is the step where human knowledge is converted to machine executable knowledge, i.e. it is the Chip circuit model One of the subsystem circuits could be a Turing Machine model that will be programmed using C or some other embedded programming language model Other subsystems chip circuit models may be built from Boolean statements, including State machines, RAM, and/or sequential circuit models. Once the logic is captured it is translated to hardware Register Transfer Level (RTL) statements through the use of a (HDL) Hardware Description Language model, such as Verilog or VHDL. The hardware description language is what actually builds the circuits such as logic gates, flip-flops, memory, a Turing Machine and much more. The RTL is used to describe hardware in a hierarchical fashion at all levels of detail. Verification models are employed and logic changes are made until the RTL design matches the human conceived ideas of the functional specification.

This step, called RTL Synthesis, happens after a functional verification of the RTL is complete. The purpose of RTL Synthesis is to translate the RTL into a Gate Level Netlist and is accomplished using a synthesis modeling tool A synthesis model takes the RTL hardware description and a standard cell description together to produce a Gate Level Netlist. Synthesis Gate Level Netlist models try to meet constraints such as speed, power, size that are input to the model by a Chip designer. The Gate Level Netlist is a standard cell structural description of Machine Execution Knowledge that now represents the Human Conceived Knowledge captured in the Chip Functional Specification. The Gate Level Netlist is now simulated, which means that the Gate Level Netlist is executed by the synthesis modeling tool to verify that the execution intelligence will meet the ideas captured in Chip Functional Specification.

Physical Implementation generates a geometric layout of the Chip from the Gate Level Netlist and is done according to design rules of the fabrication process. The Physical Implementation step is made up of three parts: floor planning, placement and routing A GDSII file is produced that will be used by the integrated circuit foundry to make the Chip. It is the GDS file that defines the arrangement of the Chip transistors as a model of human intelligence. The last step is Chip Verification which verifies that final hardware meets the specification for functionality and throughput.

The Flowpro Machine Model may be a parallel model of computation that uses Parallel Asynchronous Stateless Flowcharts to capture human conceived knowledge (ideas) and Parallel Asynchronous Stateless or Stateful Hardware to execute those captured ideas. With a Flowpro Machine Model, lines on flowcharts become wires in the Chip and blocks on flowcharts become individual Flowpro Machine Atomic circuits in the Chip. A Flowpro Machine may thus be a collection of parallel and sometimes ordered flowcharts that execute on Turing machines or natively with a unique configuration of transistors on the Chip. Decision based thinking and parallelism taken together are the engine that powers Flowpro Machines.

Figure 3:
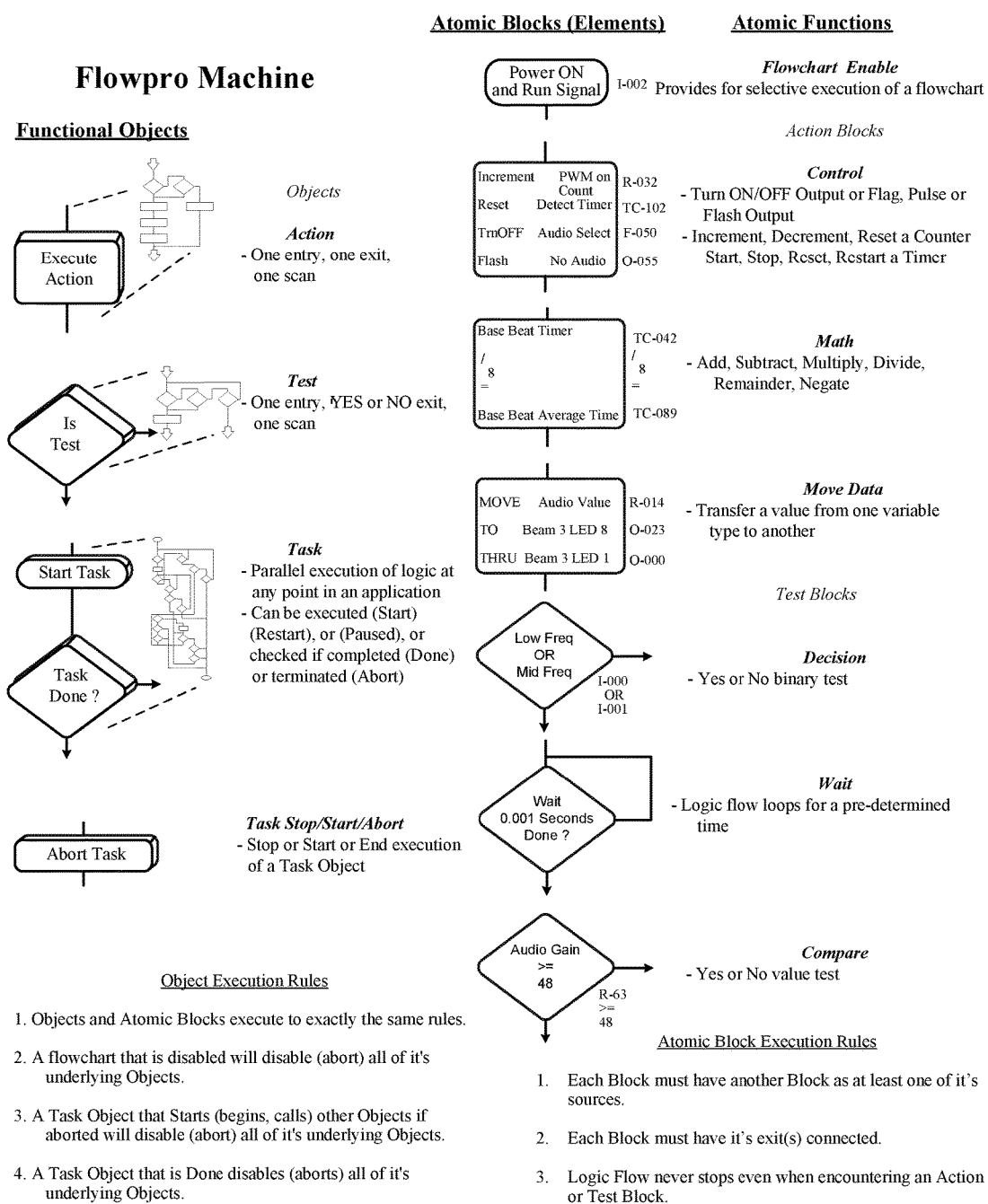
FIG. 3 is an illustration of a number of possible components within an exemplary Flowpro Machine Computational Engine, in accordance with some embodiments of the disclosure.

A Flowpro Machine uses a decision language, in some embodiments. We define a decision language as any alphabet or symbol which will affect the control flow of states or functions of a computation. Flowpro's decision language is a decision flowchart model with explicit attributes to transfer knowledge from an originator to a receiver. Whether creating knowledge or troubleshooting knowledge in the Chip, a flowchart is the consistent view of the knowledge and it's processing Flowcharts are an excellent way to capture ideas and to show parallelism of those ideas at the same time. A Flowpro Machine flowchart consists of an Enable function and Atomic Blocks and/or functional objects. There are three functional object types, Action Object function, Test Object function and a parallel Task Object function. These objects are made up of other objects and Atomic Blocks, which are assembled according to specific rules. Atomic Blocks manipulate variables, which in a Flowpro Machine are strongly typed and numerically sequenced, and invoke Atomic Functions such as, MOVE X TO Y, T.OFF, T.ON, START, STOP, RESTART, RESET, and more (see FIG. 3). In particular, FIG. 3 is an illustration of a number of possible components within an exemplary Flowpro Machine Computational Engine, in accordance with some embodiments of the disclosure.

Flowpro Machine Parallelism

A Flowpro Machine executing on a Turing machine is a concurrent model of execution, meaning that portions of each task are executed as the computation advances. A Flowpro Machine executing in the Chip's hardware are parallel hardware tasks but selective groups of tasks can be made concurrent. Concurrency execution can be advantageous in some applications because it eliminates race conditions and shared resource problems since each task will get its turn to execute. Flowpro Machine concurrency execution model on a Turing Machine is well established. Transferring the Flowpro Machine concurrency and parallel models to a Chip is novel.

Because a Flowpro Machine model can have either or both concurrent and parallel execution, a better term is parallelism. Parallelism refers to having a parallel structure or having the appearance of being parallel. Concurrency or (Concurrent Computing), which is sometimes referred to as multitasking is generally a term that is used in the context of a single processor but can apply to a multi-processor system Flowpro Machine Parallelism is therefore exploiting concurrency and parallel execution with a fully integrated graphical flowchart software development and runtime system that is a visual representation of runtime parallelism A Flowpro Machine is a Parallel System.

Figure 4A:
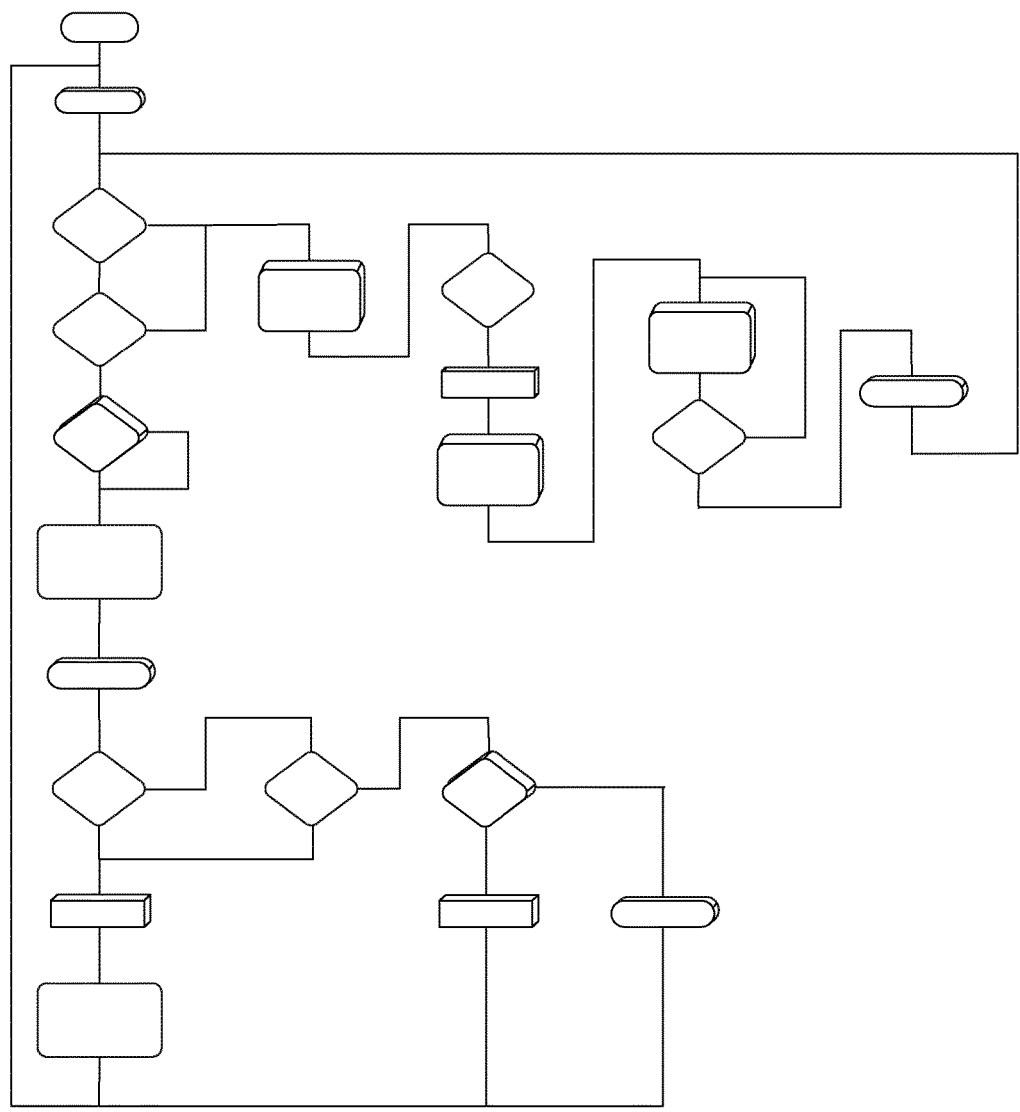
FIG. 4A is an illustration of a Flowpro Machine flowchart that contains both 2D and 3D elements, in accordance with an exemplary embodiment of the disclosure.
Figure 4B:
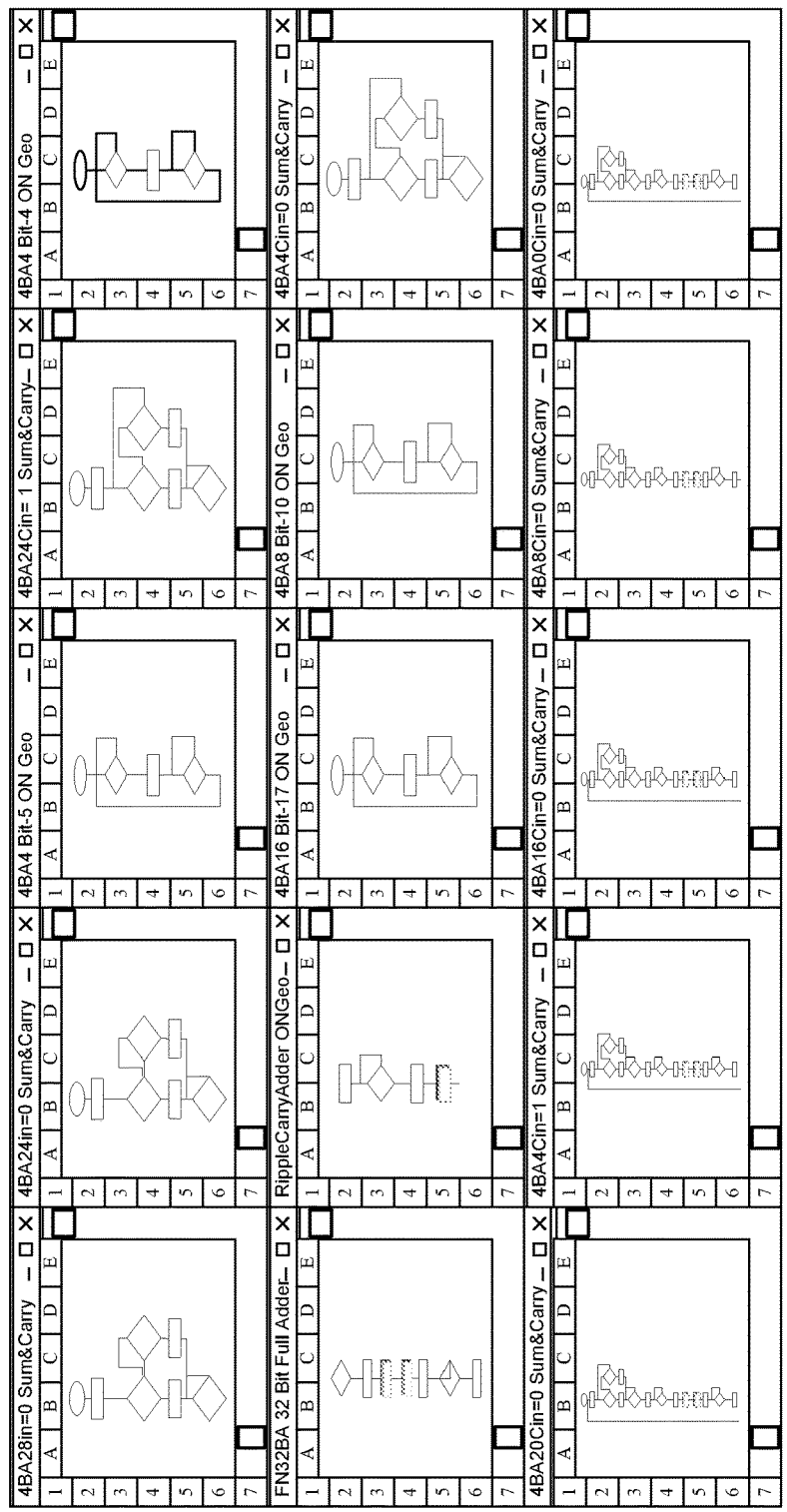
FIG. 4B is an illustration of multi-flowcharts used to implement a 32-bit stateless adder, in accordance with an exemplary embodiment of the disclosure.

As shown in FIGS. 4A-4B, Flowpro Machine flowcharts can overcome their perceived limitations in multiple ways and enhance the ability of flowcharts to model and execute complex systems. Flowpro Machine flowcharts 'are the code' when executing on a Turing Machine and are the hardware structure when on the Chip. Flowchart conversion to a text language or any other language is not required. Documentation (the flowchart) is always up to date as feature changes occur and bugs are found. Flowpro Machine flowcharts are a graphical programming language and GO TO statements are eliminated by lines leading from one element to another. Most assume that there is one large flowchart that represents an application, but with Flowpro Machine parallelism there are many small flowcharts and flowchart objects. Flowpro Machine flowcharts are object oriented and are constructed in a hierarchical fashion. Flowpro objects make Flowpro Machines easier to understand and reuse while enhancing software readability and localizing variables. Object oriented flowcharts help expose the parallelism of an application by partitioning logic into what will become separate Flowpro Machines (FIG. 4B).

Flowpro Machine Ordering

Flowpro Machine variables are sequentially labeled, and Objects and Blocks are sequentially ordered before executing Atomic monotonic ordering of flowchart Elements (objects and blocks) is important in a Flowpro Machine to ensure that the machine execution intelligence is consistent across all Flowpro models. Variables, which are strongly typed, are sequenced by number beginning with reference 0 and extending to (N−1) references of that type. Flowpro Machines can use index references for quick reference in Flowpro Machine applications. Variables can be referred to by the index number or an alphanumeric label field.

Sequentially ordering of Flowpro Elements is a human conceived process that executes in a machine, a computer, and is referred to as the Compile process. As with any description of knowledge, incomplete logical connections are a potential problem A Flowpro Machine compile process ensures that all connections on all flowcharts are made according to specific rules. These flowcharts of sequential and parallel functions can have relationships of time. This relationship of time happens in regard to Elements on a flowchart and between elements on different flowcharts and between different flowcharts. Sequentially numbering the execution order relationship between Elements on a flowchart will ensure that the machine intelligence exactly follows the human intent.

Flowchart Creation

Figure 5A:
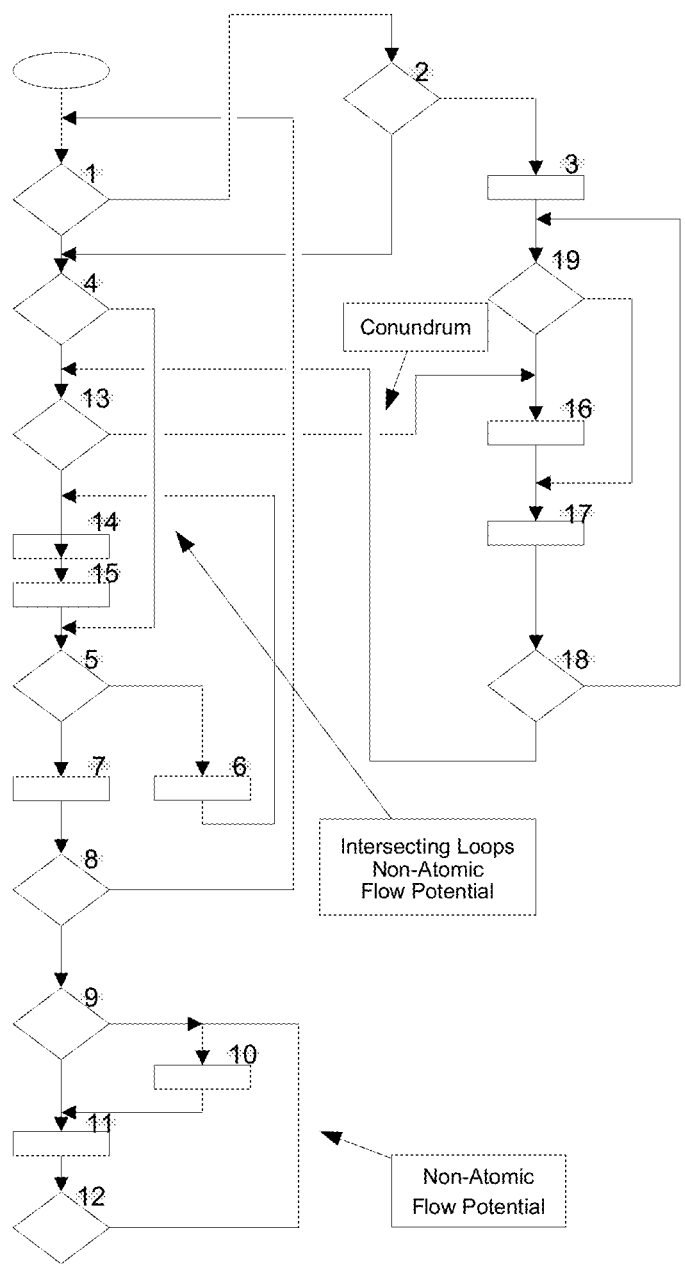
FIGS. 5A-5B illustrate the differences between a well-formed flowchart for a Flowpro Machine and a compromised flowchart, in accordance with an exemplary embodiment of the disclosure.
Figure 5B:
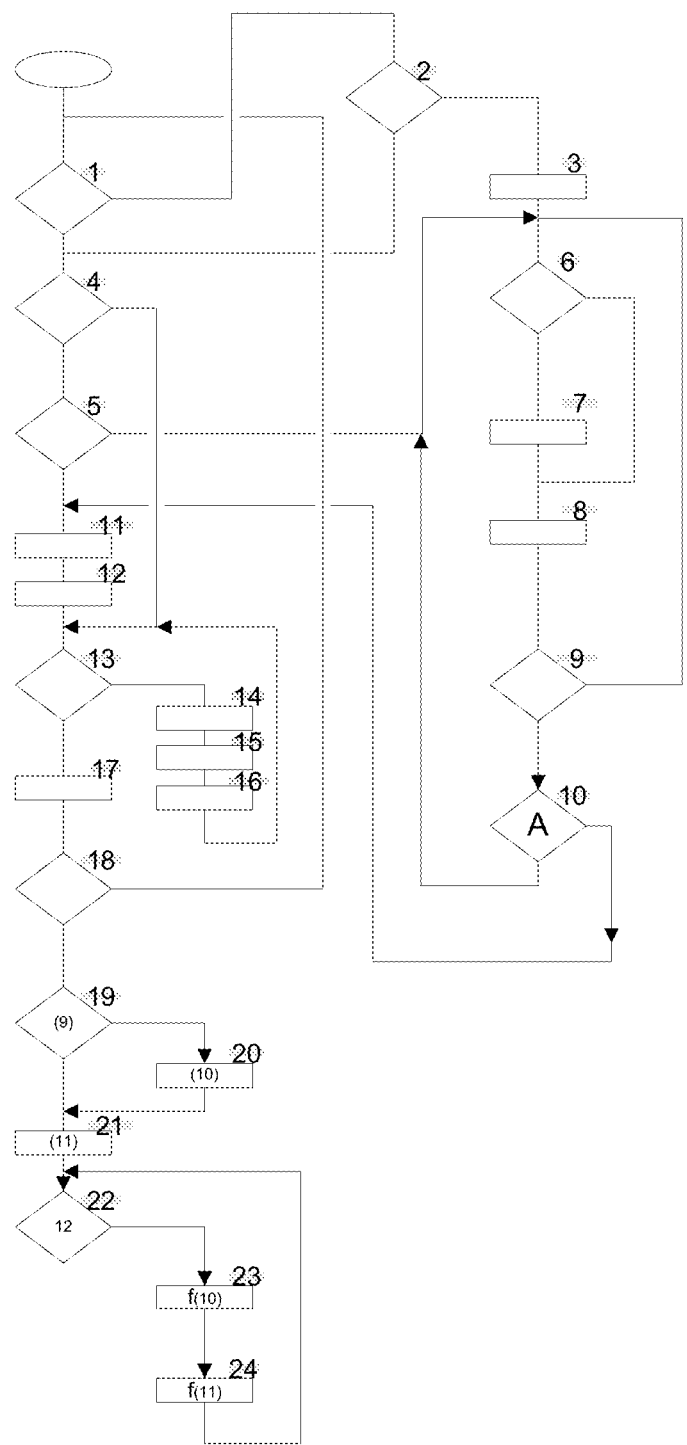

Creation of flowcharts reflect a personal style but in general a flowchart flows from upper left to the lower right on screen. Flowchart blocks usually represent a sequence of steps that evolve over time as a flow. A sequential increasing numbering (ordering) method that takes into account flowchart loops makes sense. The human intent of Flowpro Machine ordering is to manipulate the placement of function Elements on a flowchart, to align the flow of functions with the flow of time and then to number each block in an Atomic fashion to match that flow of time. This is done in order to achieve a well-formed flowchart, which is a requirement of a simulated Flowpro Machine executing on a Turing Machine. The human ordering intent of a flowchart must be absolutely clear for Flowpro Machine simulation to match Flowpro Machine hardware (Chip) execution. A well-formed flowchart (See FIGS. 5A and 5B) is one that does not intersect forward and backward loops as part of its structure, nor have a numbering conundrum when Atomic ordering is applied. Atomic ordering is done automatically by the Flowpro Machine Compiler that enunciates Non-Atomic flowchart paths which can be corrected to achieve a well-formed flowchart.

Element Numbering

Atomic numbering of Flowpro elements is important when simulating a Flowpro Machine on a Turing Machine and beneficial when a Flowpro Machine is executing on a Chip. A Flowpro Machine is a parallel architecture. A Turing Machine is not parallel but can be made to simulate a parallel architecture by multitasking the Turing processor in some fashion. Multitasking of Turing flowcharts typically use one of two algorithms to switch from executing one flowchart to another in a round-robin fashion. One example algorithm (BC) may execute the Elements on a flowchart flow path until it executes one of those same Elements again and then execute the next flowchart in the same manner. Or, like a Flowpro Machine (B#), a different method that uses Atomic Element numbering (ordering) to execute the Elements on a flowchart flow path until it executes an Element whose number is less than or equal to the current executing Element and then execute the next flowchart in the same manner.

Figure 6:
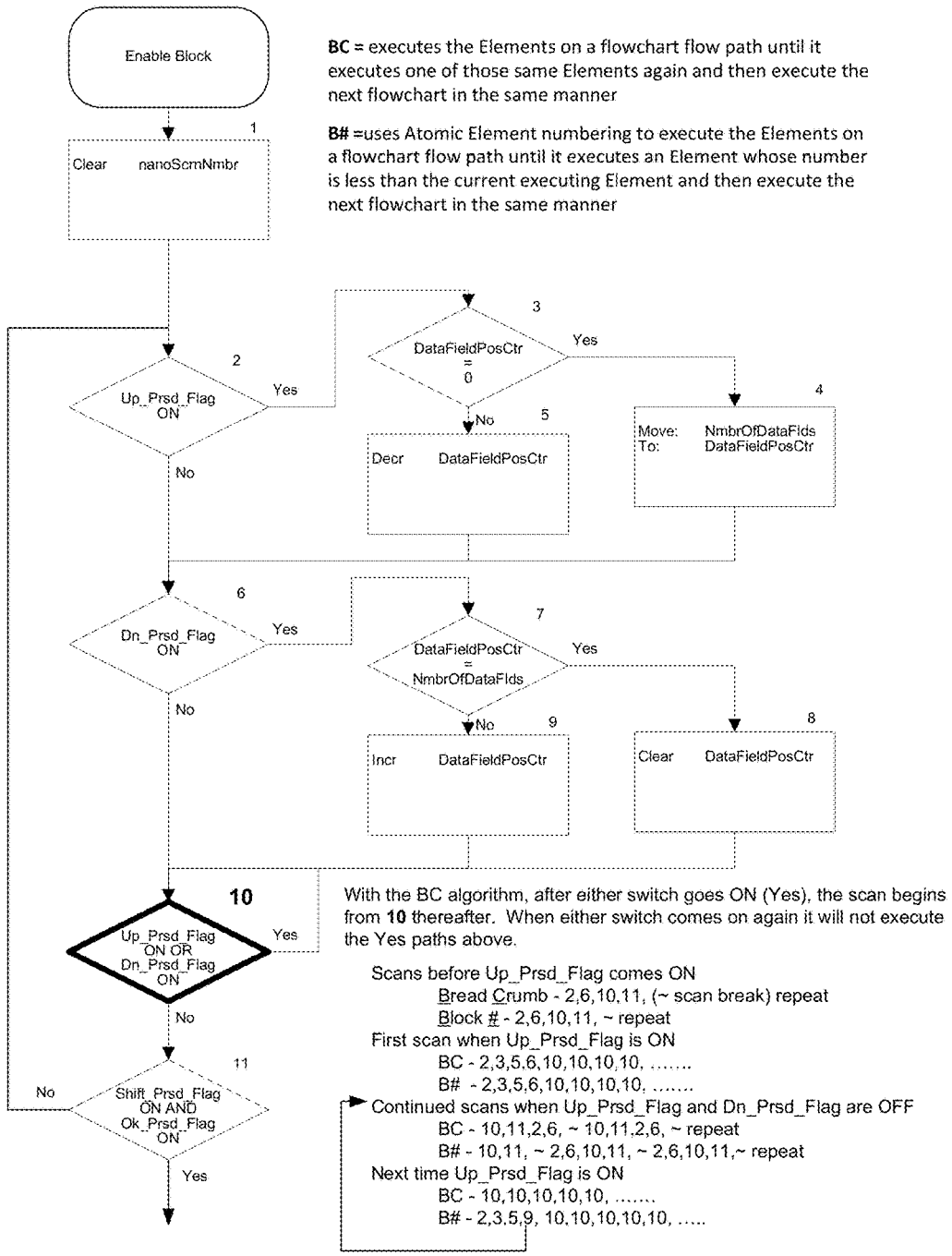
FIG. 6 illustrates how an algorithm can lead to a 'non-obvious' incorrect operation of a flowchart.

The first algorithm (BC) can lead to 'non-obvious' incorrect operation of a flowchart (See FIG. 6). For these 'non-obvious' reasons a Flowpro Machine uses Atomic ordering execution when simulated on a Turing Machine. Flowpro Machine hardware will accommodate flowcharts that are not well formed but the consistency between Flowpro Machine models will be lessened. Well-formed flowcharts with well-formed creation and execution rules guarantee consistency of models between Flowpro Machines. Consistency facilitates testing of 'behavioral models' early in the design cycle knowing that those models translate directly to Flowpro Machine hardware.

Flowcharts and Objects Element Execution

All Elements are executed in a sequence that is determined by the flow lines. Action and Test blocks as well as Action and Test objects execute in an Atomic fashion in which each flowchart path on each flowchart 'appear' to execute in a single instant. Evaluating all of the active Elements in all flowcharts and Task Objects once is referred to as logic solve and when system overhead is included, such as an I/O cycle, it is referred to as a scan. A Flowpro Machine logic solve on a Turing Machine is 'ordered', therefore the logic to solve is the sum total of each flowchart's logic solve at any given instant. For example, if there are 100 Flowpro Machine flowcharts simulated on a Turing Machine and each has a logic solve of 0.001 seconds, the total logic solve is 100×0.001=0.1 seconds. In a Chip there would be 100 parallel Flowpro Machines, meaning that the total logic solve is equal to the longest parallel flowchart logic solve or the total logic solve of the longest ordered set of Flowpro Machines. This parallelism (1×0.001=0.001 seconds) shows the advantage of going straight to Chip hardware with a Flowpro Machine.

Atomic Path

An Atomic Path is a sequence of Elements on which all the numbered Elements on that path are in ascending order. A Flowpro Machine Test Element that loops on itself is an Atomic Path of one Element. An Atomic Path also means that at any given logic solve instant an Atomic Path on all of the flowcharts is executed.

Atomic Time

Atomic Time is the maximum execution time allowed for any Atomic Path. Instantaneous execution can have diverse human intent. Sometimes instantaneous means zero time or conceptually 'the speed of light' or just really, really, fast. In reality, different applications can allow different definitions of instantaneous in a Flowpro application and yet Flowpro's atomic structure will be maintained. For instance in a machine control application a maximum Scan Time of 20 milliseconds is typical, so an Atomic Time of 0.02 milliseconds or faster can be assumed and used by the Flowpro Machine Compiler.

The compiler calculates each flowchart path execution time and generates a warning or error message for any path that exceeds the Atomic Time. A radar system may need a Scan Time of 20 microseconds and a Flowpro Atomic Time of 0.02 microseconds, yet a banking system may only require a Scan Time of 200 milliseconds. Each Element execution time is known for each Flowpro Machine functional object. This is based on a Turing Machine or a Flowpro Machine, and the specific processor or Chip fabric. In all of these cases a human intent, minimum, Flowpro Machine Atomic Time must be achieved through more powerful hardware or more efficient software. This must be done to maintain the parallelism that is explicitly shown in the Flowpro Machine application flowcharts that are executing. Of course, another solution may simply be moving from serial Turing Machine architecture to a Flowpro Machine parallel Chip architecture or a combination of both.

Continuous Scanning

As stated above the process of evaluating all of the active Elements in all flowcharts and Task Objects and servicing overhead functions once is referred to as a scan. Whether a Flowpro Machine scan is concurrent, appear to operate in an instant on a Turing Machine, or as Chip parallel Flowpro Machines that do operate in an instant, this scanning process is continuous and not programmable.

A Flowpro Machine is a single or a collection of Stateless Computational Waves that continuously execute flowchart Elements while moving along the flowcharts according to specific rules. With well-formed flowcharts the Computational Wave executes the Elements in ascending order following the flow lines until it loops back to an Element of equal or lower number. Execution reinitiates from this Element and will continue until looping back.

Assembling Flowpro Machine Asynchronous Hardware

The following description of Flowpro Machine circuits utilizes an 'ideal' switch component on schematics to emphasize operation of the circuit without being encumbered with actual circuit details. Circuits that perform Flowpro Machine Action Block and Test Block functions can be implemented in various ways to achieve the same operating function as described using ideal switches. Whether these circuits use PASS transistors, CMOS transistors, or no transistors, with dynamic or static circuits is immaterial to the functional description of the circuit. Those skilled in the art will be able to take advantage of Flowpro's simple structure and asynchronous operation to create optimized Flowpro Machine circuits.

Figure 7A:
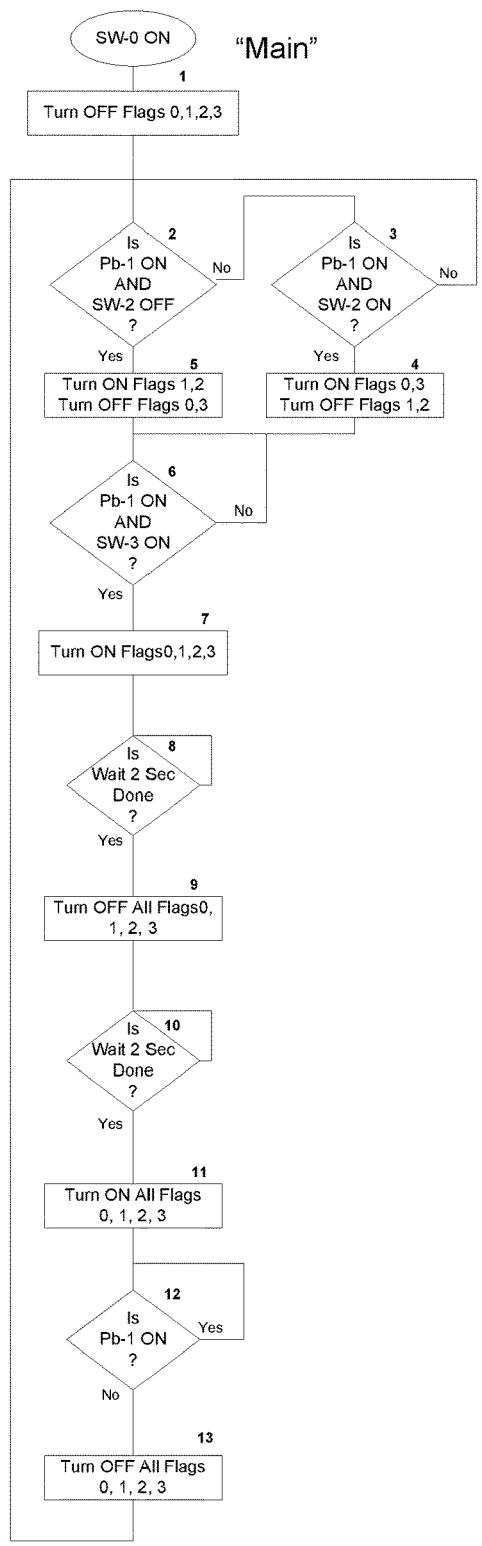
FIGS. 7A-7C illustrate three Flowchart Machines with behaviorally equivalent but with different hardware implementations, in accordance with some embodiments of the disclosure. In particular.
Figure 7B:
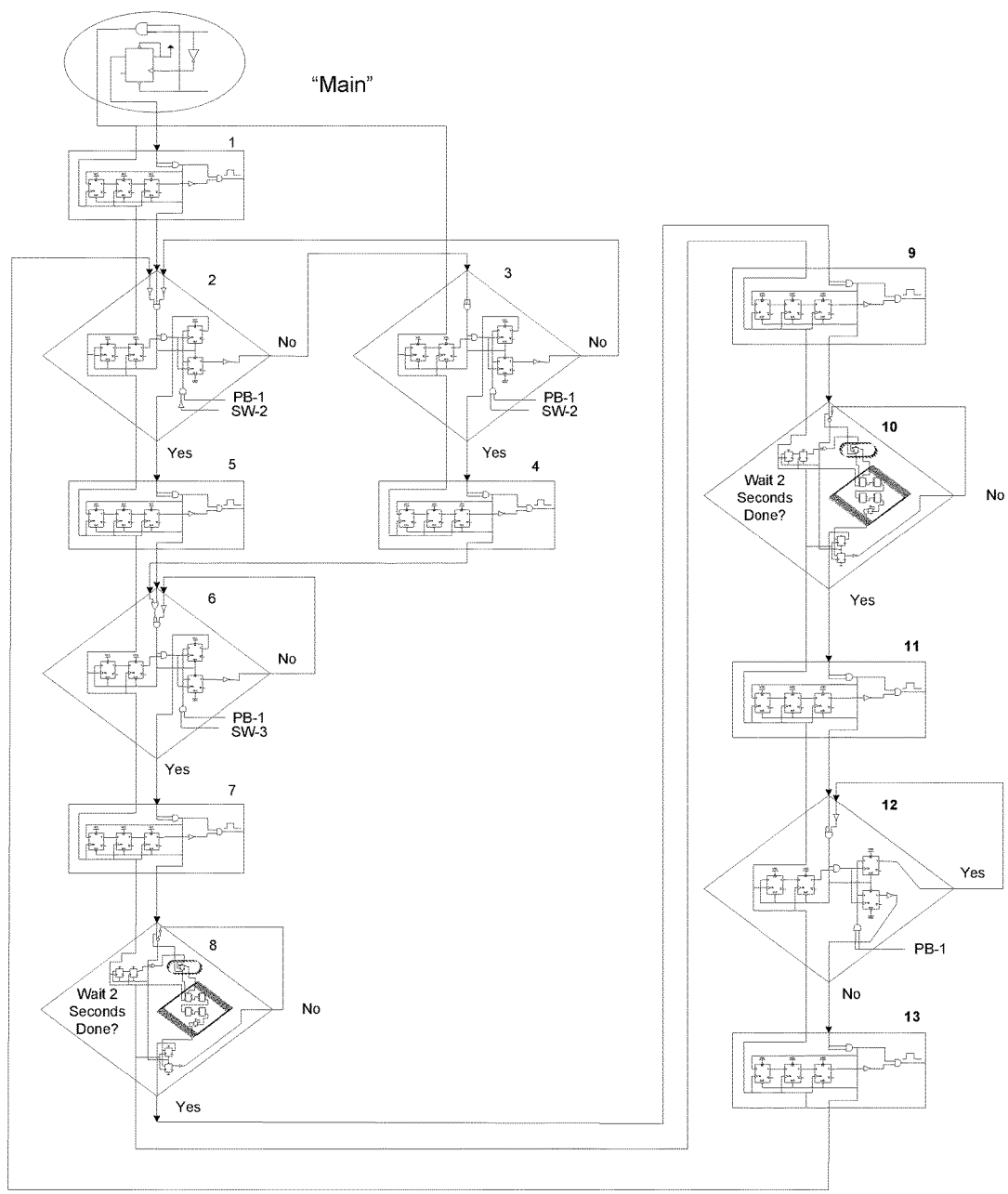
Figure 7C:
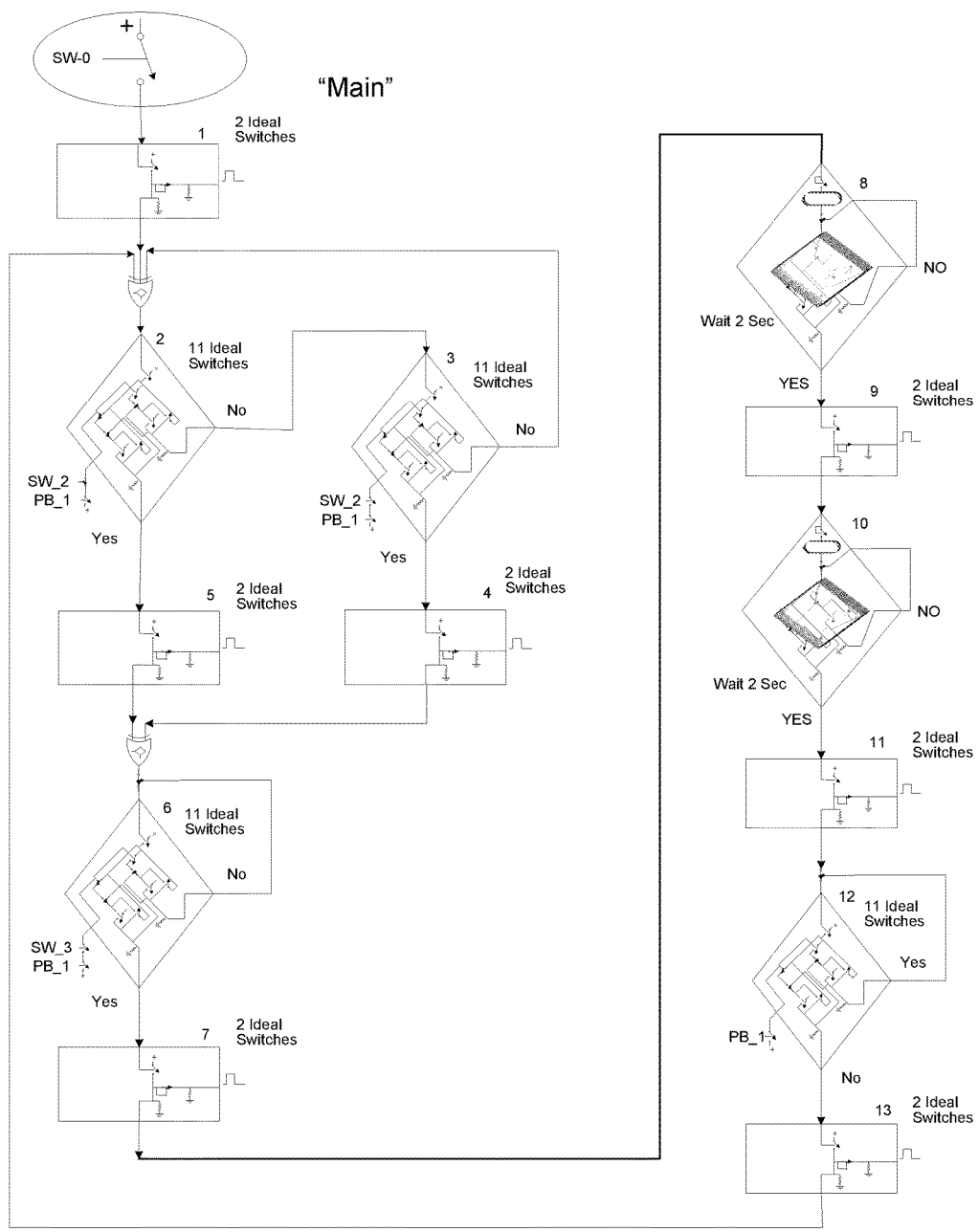

As shown in FIGS. 7A-7C, the three Flowchart Machines shown are behaviorally equivalent but with different hardware implementations. The flowchart "Main" is taken from the FC_1_V5 (FIG. 26A) proof of concept application and is used for comparison. The uniqueness of a Flowpro Machine is not the circuits used in Action and Test Blocks, but it is the Action and Test Block operating functions of managing the Computational Wave of a Flowpro Machine. A Test Block simply makes a binary decision on some input parameter and directs the Computational Wave to the Yes or No propagation path. An Action Block reacts to the Computational Wave by performing actions (computations) and passes the wave to the next Flowpro Machine Element. The circuits used to direct, to react, and to pass the Computational Wave are not unique, but the fact that Flowpro Machine Blocks manage the Computational Wave to do computations, is.

Building FPGA and 'Ideal' Flowpro Machines

For illustrative purposes, a manual process is used to describe building a Flowpro Machine in Chip hardware. Automating this manual process is achievable for those skilled in the art of compiler and chip hardware designs.

Building a Flowpro Machine begins with creating a flowchart, as in our case, or multiple flowcharts for more complicated applications. The 'human conceived' flowchart "Main" is drawn using a pencil on a piece of paper according to Flowpro Machine rules discussed earlier. The salient rule of a Flowpro Machine is that every Block output can only connect to one other Block or Object (Elements) and every output from every Element must be connected. Next, we number all of the Elements (Blocks) on flowchart "Main" according to Flowpro's unique Atomic numbering engine, which tries to number a flowchart such that each Element is of a higher number than all elements leading to it. Our flowchart is now ready to implement in hardware.

Meanwhile, a copy of the drawn-up flowchart is passed to 'Behavioral Test' to ensure that the human conceived flowchart behaves as described by the Requirements. Behavioral Test is a Flowpro Machine simulation on a Turing Machine. Flowchart "Main" is keyed into a product such as Flowpro V2.8 which displays the flowchart on screen while executing the Flowpro Machine algorithm in a Turing Machine. The unique Atomic Ordering Engine is built into the Flowpro V2.8 compiler. Debugging of flowcharts, flowchart modifications and improvements can occur before and while the hardware is being created. It is only the response time of the Flowcharts that changes between a Turing Machine simulation and a Flowpro Machine in hardware and not the behavior.

Implementing the Flowpro Machine hardware begins with selecting the hardware target, which can be a standard FPGA or a Chip that is optimize toward a Flowpro Machine 'Ideal' architecture. We will do both as shown in FIG. 7.

Step—Build the Enable Block Hardware

Figure 7D:
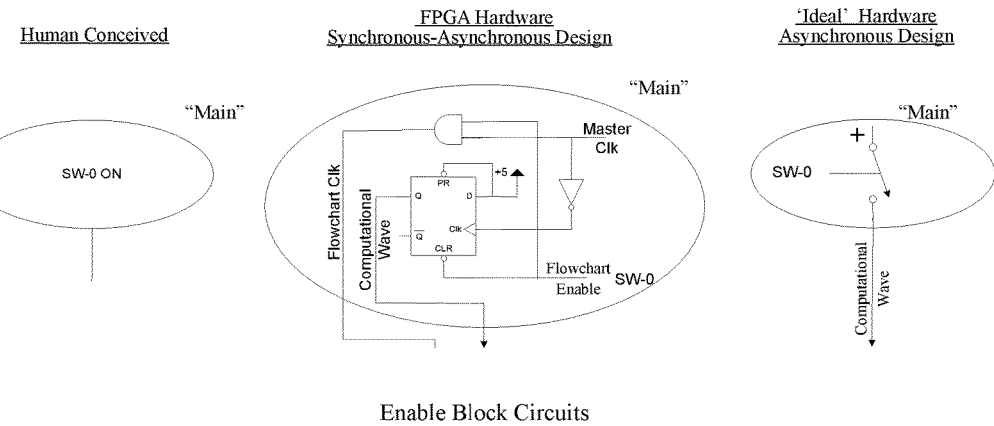
FIGS. 7D-7I illustrate various components of exemplary flowcharts, in accordance with some embodiments of the subject disclosure. In particular, FIG. 7-D shows enable block circuits.

As shown in FIG. 7D, the Human Conceived (HC) of the Enable Block is always an implied POWER ON and in this case Switch-0 must be ON for the flowchart to begin operation.

In the case of FPGA hardware, a combination synchronous-asynchronous design approach is required in most cases. The human knowledge contained in the flowchart will react to events in an asynchronous manner, but the Computational Wave will propagate through the flowchart synchronous to the master clock. To build the Enable Block, select the FPGA Enable Block template worksheet and add Switch-0 to the Flowchart Enable line. At Power ON the master clock will begin and the Computational Wave is initially low or OFF. Turning ON Switch-0 will initiate the Computational Wave.

With 'Ideal' hardware (I) of FIG. 7D the design and operation of Flowpro Machine Elements is asynchronous and reaction to events and propagation of the Computational Waves are asynchronous. To build the Enable Block, select the 'ideal' Hardware Enable Block template worksheet and add Switch-0 in series with +V. When power is on and Switch-0 closes the Computational Wave initiates.

Step—Build Block #1 (Action Block) Hardware

Figure 7E:
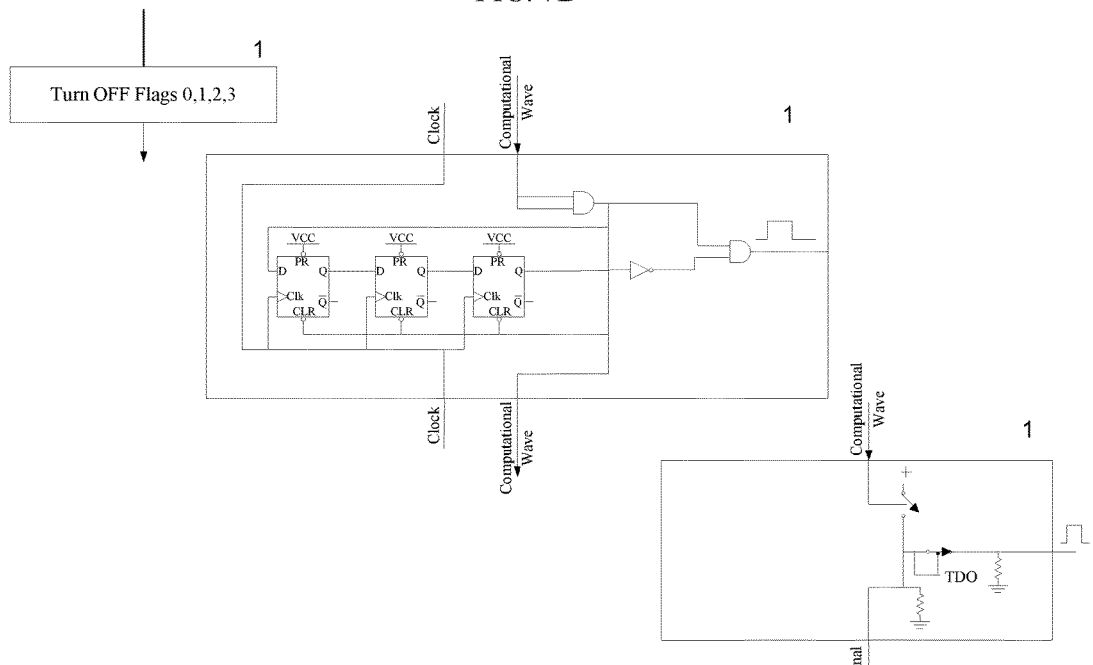

As shown in FIG. 7E, human Conceived (HC) Action Blocks control hardware functions through the use of an Action Spike, a pulse that is routed to hardware structures for I/O, memory, timing, movement of data, or for interface to other computational systems such as State Machines, Boolean logic or even Turing Machine based routines.

Figure 9:
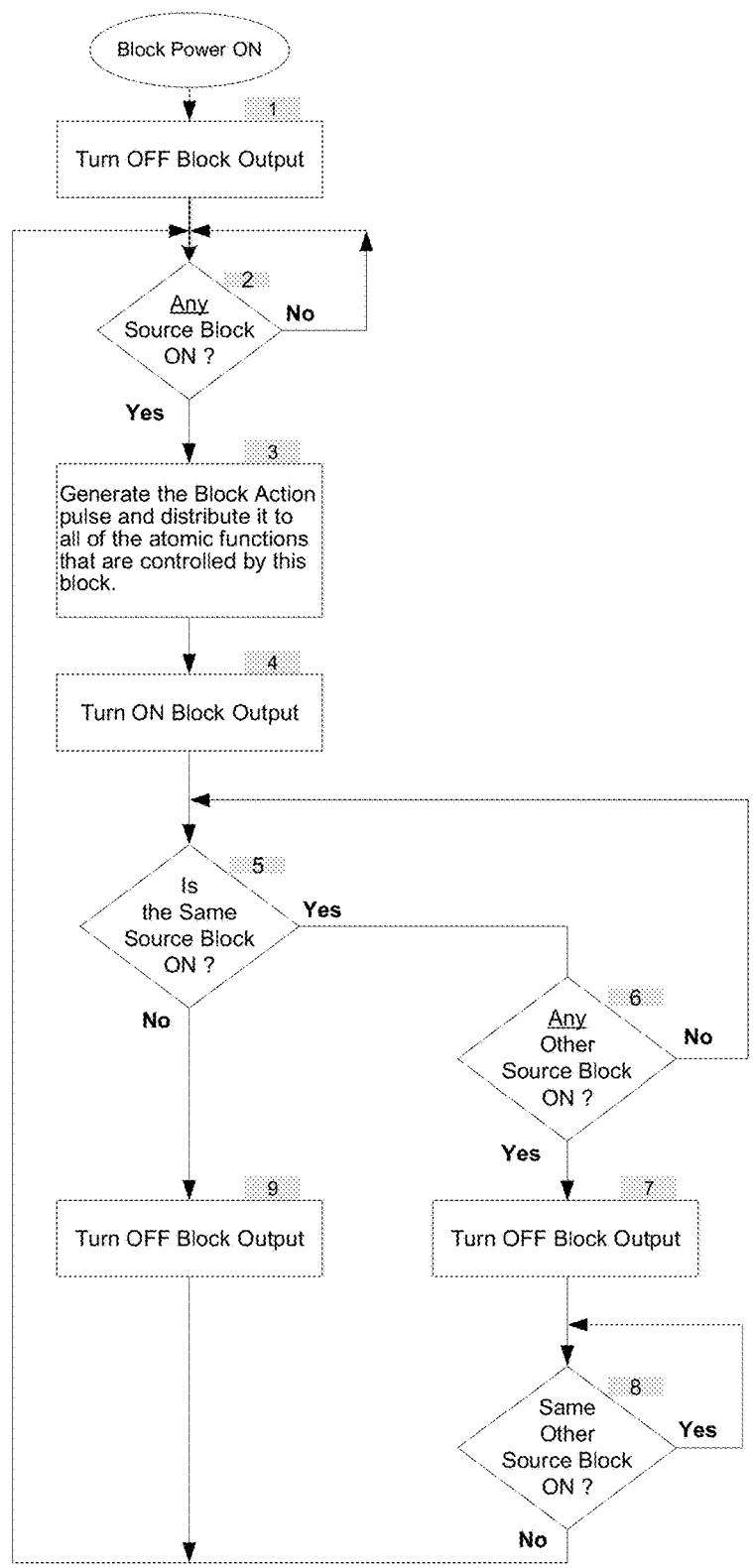
FIG. 9 is an illustration of an atomic action block operating procedure, in accordance with an exemplary embodiment of the disclosure.
Figure 26A:
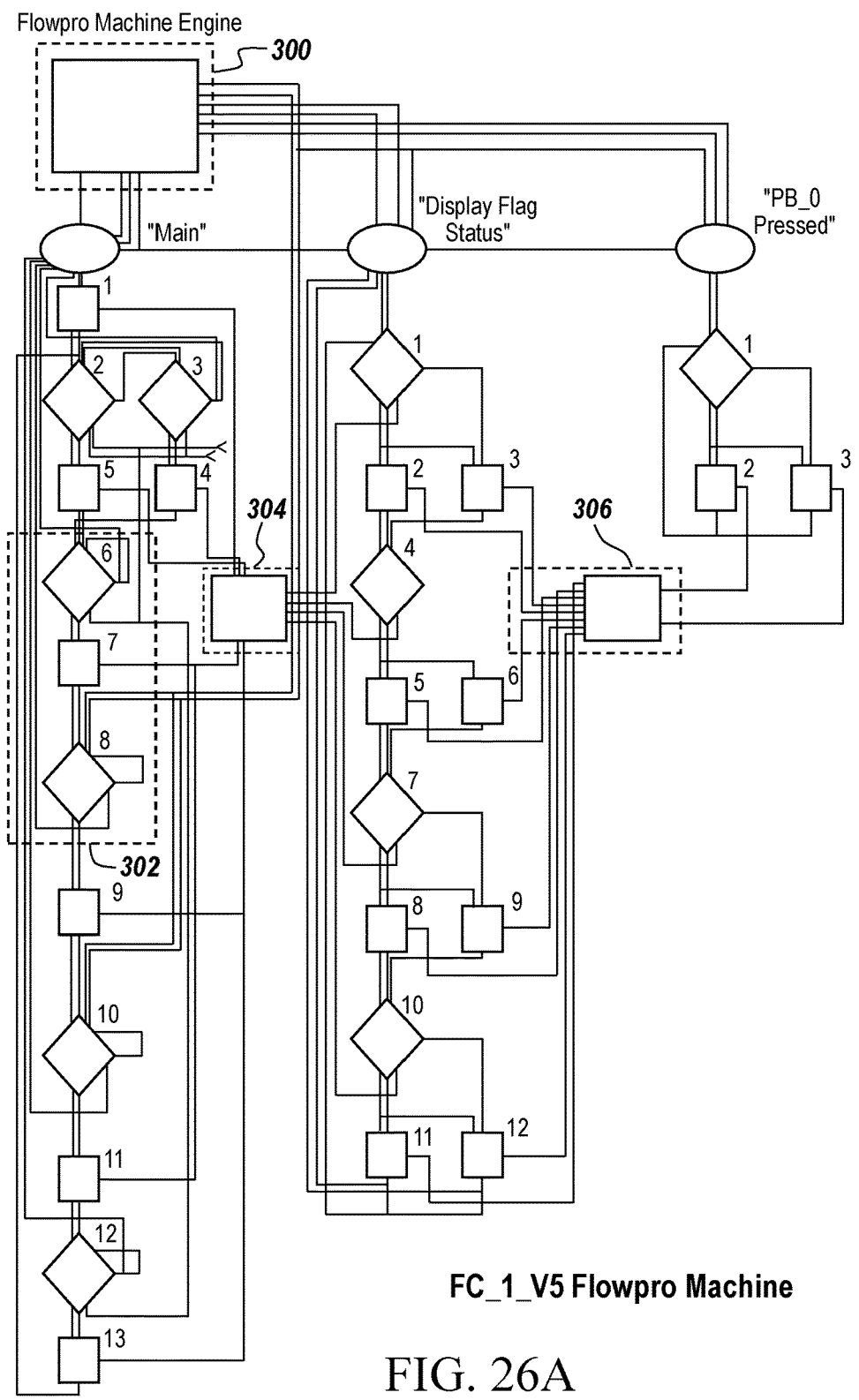
FIG. 26A is an illustration of an exemplary FC_1_V5 Flowpro Machine, in accordance with some embodiments of the subject application.

FPGA working details are explained under the FC_V_1 Action Block description of FIG. 26A. To build an action Block, select the FPGA Action Block template worksheet. Then, on the worksheet record the block number of the current Block you are working on and the block number of the block that is the destination of the current block. Determine what other circuits the Action Spike, pulse, will connect to. List these on the worksheet and connect the action pulse to them when the circuits are input to the FPGA development system 'Ideal' Hardware Action Block building follows the same procedure as the FPGA Action Block building but with different internal circuits. (See FIGS. 8, 9)

Step—Build Test Blocks Hardware

Figure 7F:
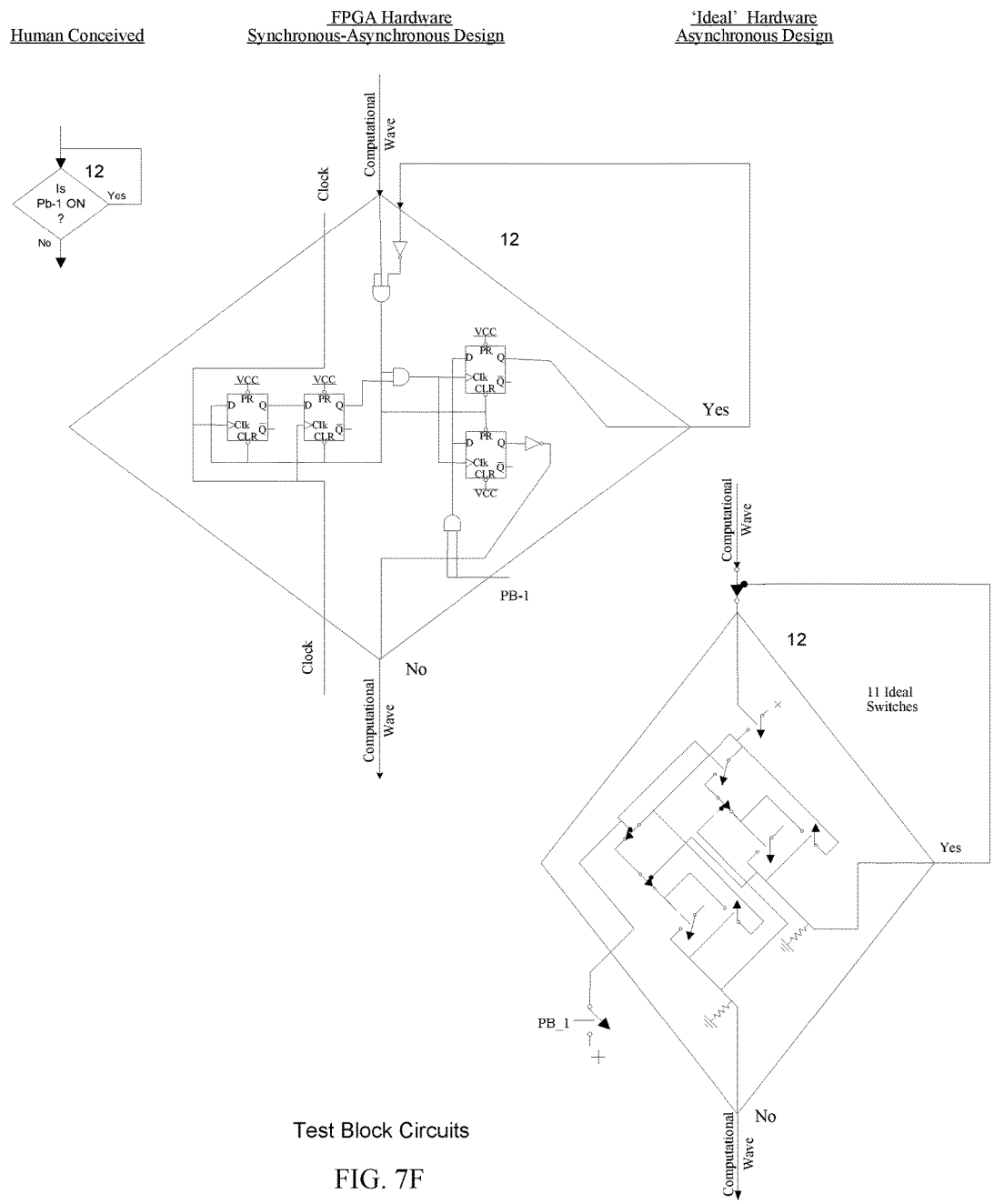

As shown in FIG. 7F, human Conceived Test Blocks are a binary, a value, or a more sophisticated decision that result in a Yes or No answer. FPGA working details are explained under the FC_V_1 Test Block description in FIG. 26A. To build a Test Block, select the FPGA Test Block template worksheet. Then, on the worksheet record the block number of the current Block you are working on and the block numbers of the blocks that will connect to the Yes and No outputs. Determine what the test inputs will be and list these on the worksheet for inclusion when the circuits are input to the FPGA development system. Either the Yes or the No can be used as a loop back when using a Test Block.

Figure 10:
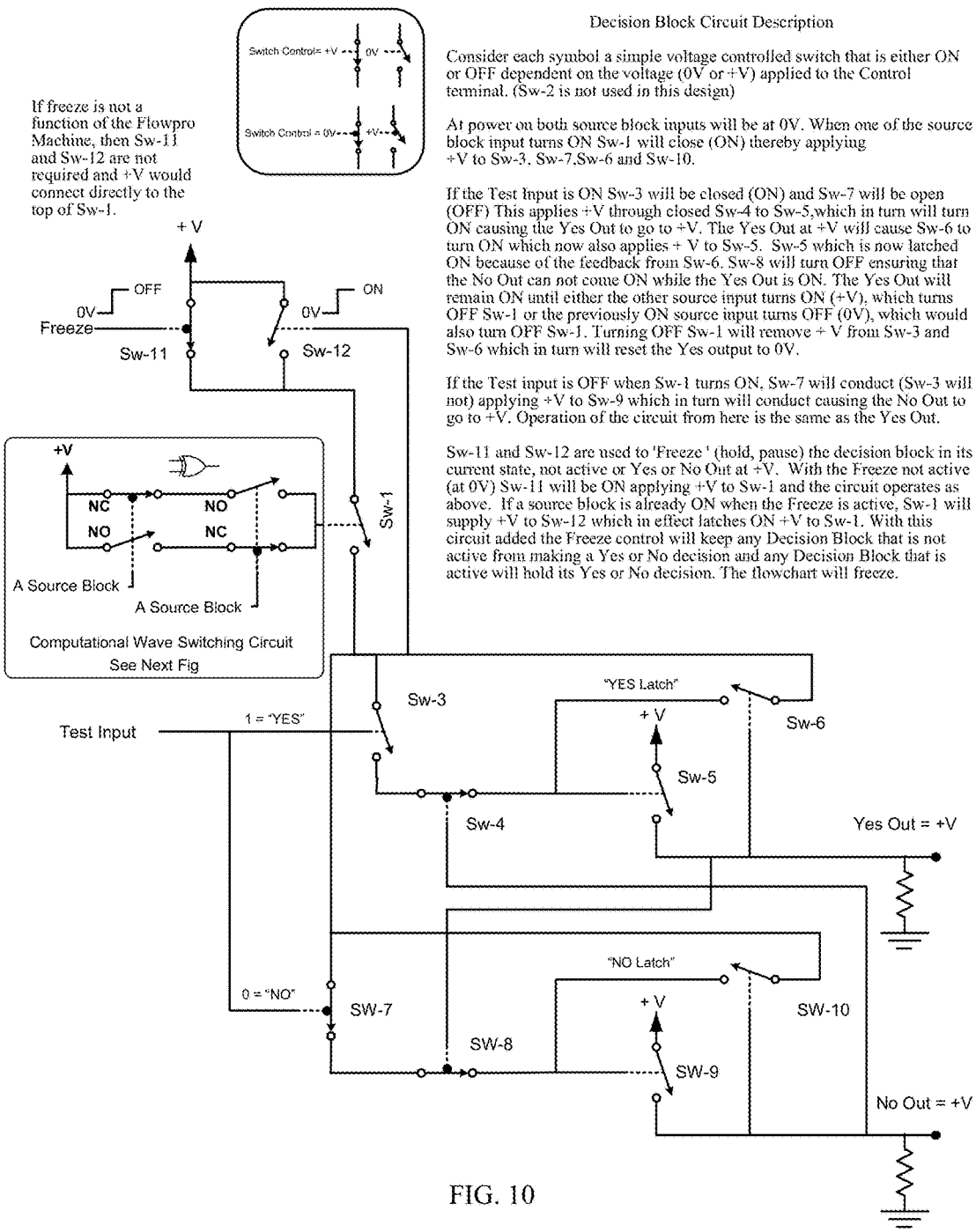
FIG. 10 is an illustration of an atomic decision block operating concept, in accordance with an exemplary embodiment of the disclosure.
Figure 11:
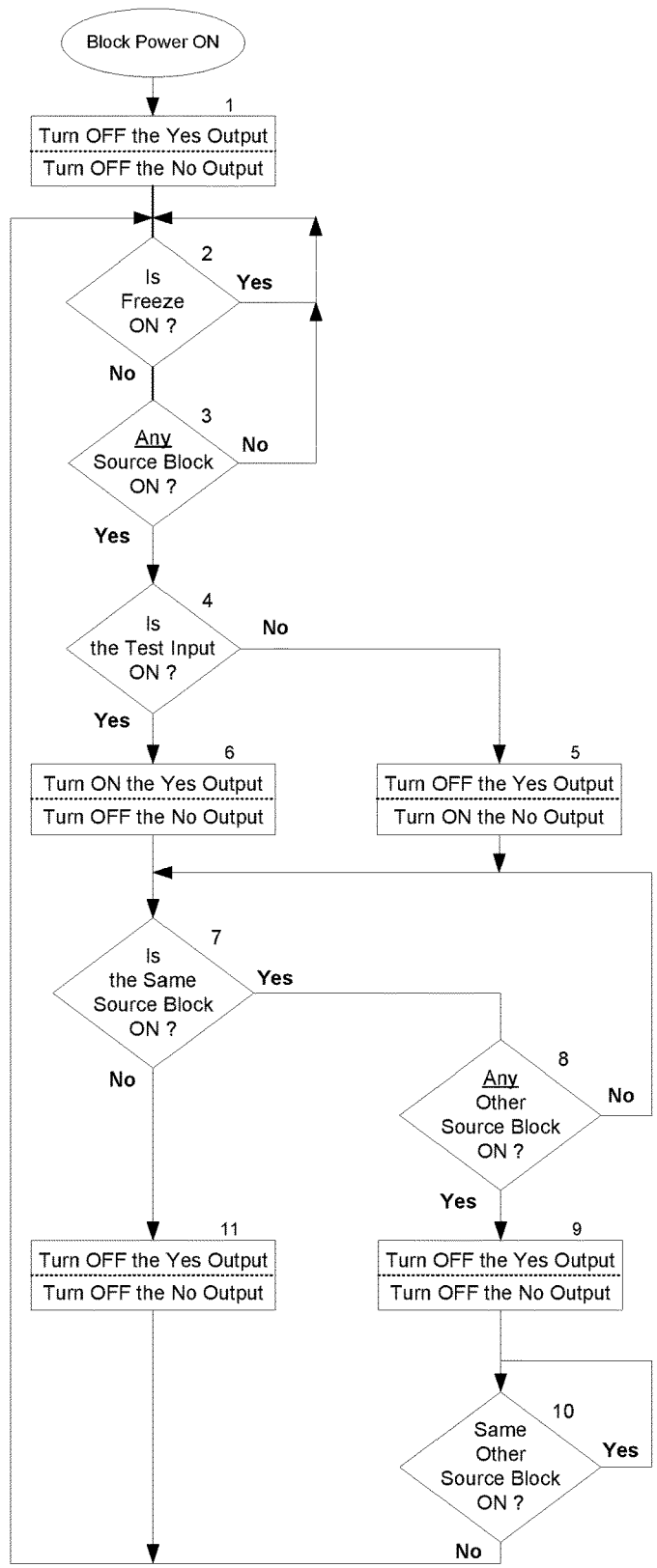
FIG. 11 is an illustration of an atomic decision block operating procedure, in accordance with an exemplary embodiment of the disclosure.

'Ideal' Hardware Test Block building follows the same procedure as the FPGA Test Block building but with different internal circuits. (See FIGS. 10, 11, 12)

Step—Build 'Wait' Test Blocks Hardware

Figure 7G:
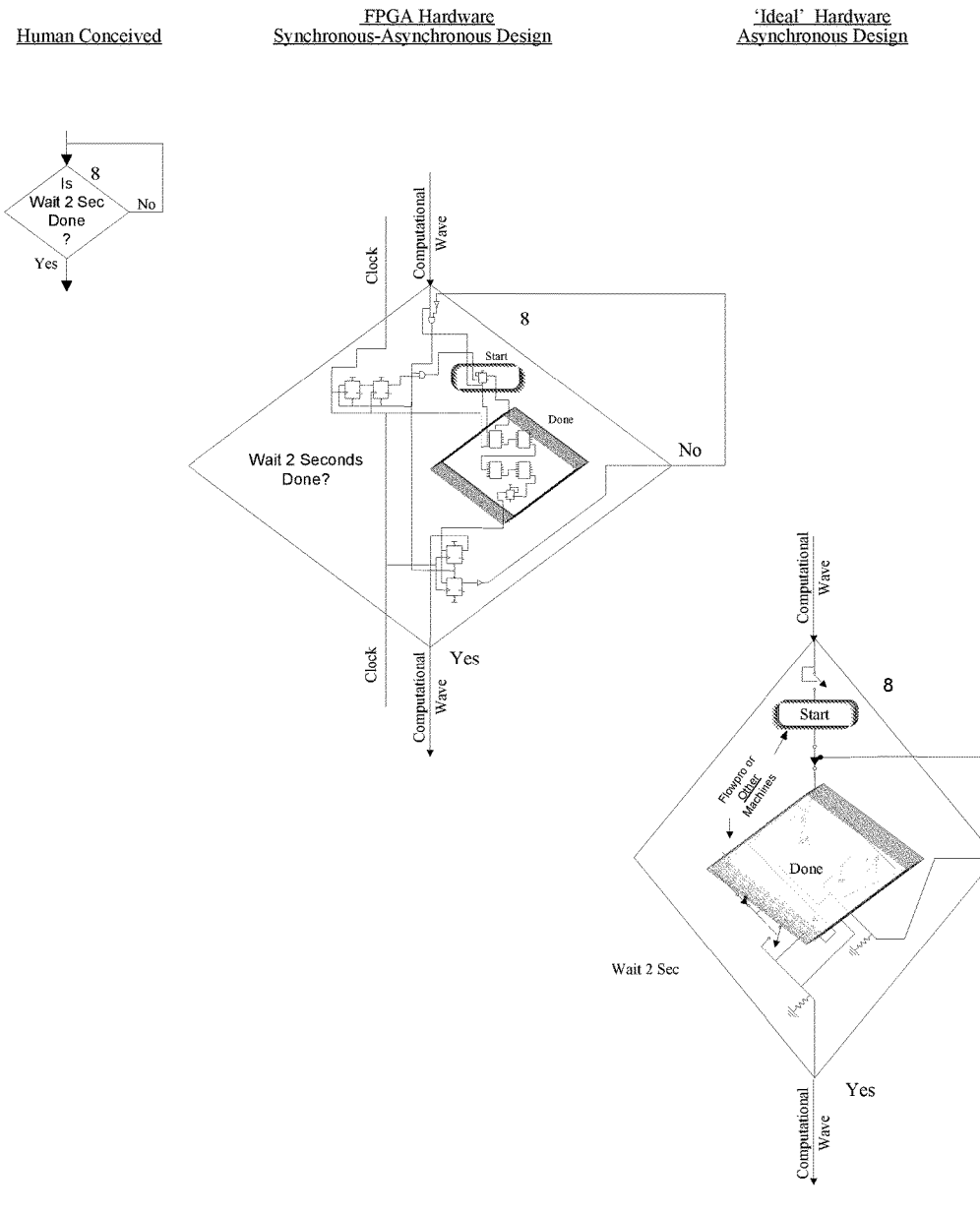

As shown in FIG. 7G human Conceived Wait Blocks are simply a delay on a flowchart but are a special case of a Test Block. They are shown as a Test Block because the Wait time must be 'Done' for the Computational Wave to propagate out of the block. Therefore, the No output is not used or editable, which has been a long-standing tradition of Flowpro Turing Machine software but it could be changed. A more sophisticated method of timing in a Flowpro Machine is to use an Atomic Timer function that has Reset, Start, and Restart Functions of an Action Block and timer Test Blocks for timer 'Done' and 'Running' status.

FPGA working details are explained under the FC_V_1 Test Block description. To build a Test Block, select the FPGA Test Block template worksheet. Then, on the worksheet record the block number of the current Block you are working on and the block numbers of the blocks that will connect to the Yes and No outputs. Determine what the test inputs will be and list these on the worksheet for inclusion when the circuits are input to the FPGA development system.

Either the Yes or the No can be used as a loop back when using a Test Block. In effect, inside of a standard Test Block is a 'State Machine Counter' Task Object that counts up a 1 ms for 2 sec before triggering the Done Flip Flop. The Done Flip Flop is continually checked for a done condition as the Computational Wave loops through the No path of the Wait Block. The design allows for an editable No, but tradition does not.

'Ideal' Hardware Wait Block building follows the same procedure as the FPGA Test Block building but would or could use a Flowpro Machine 'stateless counter (see below) or a State Machine-based counter.

Note—Task Objects

Figure 7H:
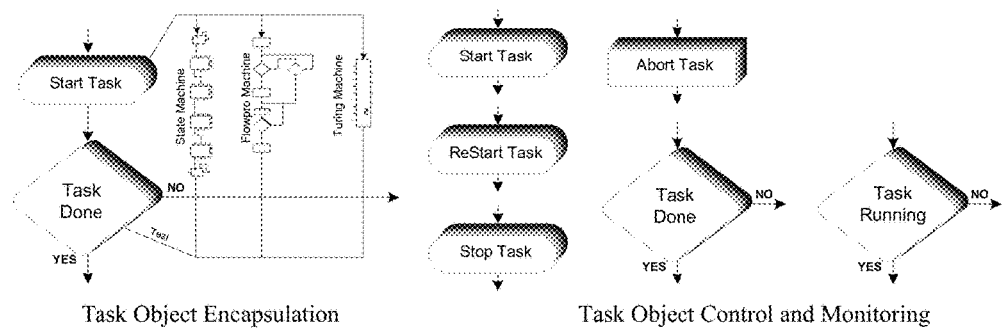

As shown in FIG. 7H, a Task Object in a Flowpro Machine is actually a separate Flowpro Machine that executes in parallel to other Flowpro Machines but can be synchronized and controlled through a standard interface. A Task Object allows loopbacks in the code (circuits) it encapsulates whereas Action and Test Objects do not allow loopbacks. A Flowpro Task Object can run circuits from any other type of Computational Machine because failure of that code (those circuits) to execute properly or complete properly will not affect other flowcharts in the overall Flowpro Machine. Bear in mind that each Flowpro Machine Element is its own groupings of transistors in potentially separate parallel Flowpro Machines. The execution failure of one Flowpro machine does not affect the operation of other Flowpro Machines running in fabric. This is not true with a Flowpro Machine simulation in a Turing Machine, where a task object is only a separate thread and bad code could halt the Turing processor.

Interface control of a Task Object is very similar to control of an Atomic Timer within a Flowpro Machine. A Start Task will begin a Task Object execution that is not already running, or it will resume running from the point that the Task Object was previously stopped using the Stop Task action command. An Abort command terminates The Task Object and all Task Objects that were 'Started' by this level Task Object. A top-level Task Object that becomes Done will Abort all of the Task Objects under it.

A Task Object begins execution when a higher level flowchart executes a Start Task Element which sends a signal to the Task Object to begin an independent Computational Wave. If the higher-level flowchart does not interface to the task object at any other point, then the Task Object interface circuitry need only have an Enable Block that begins when a signal is sent to it. If the calling flowchart does use other Task Objects functions then the Enable Block circuitry of the Task Object must be able to Start, Restart, Stop and Abort the Task Object circuits.

Step—Build 'Loop Back' Hardware

Figure 7I:
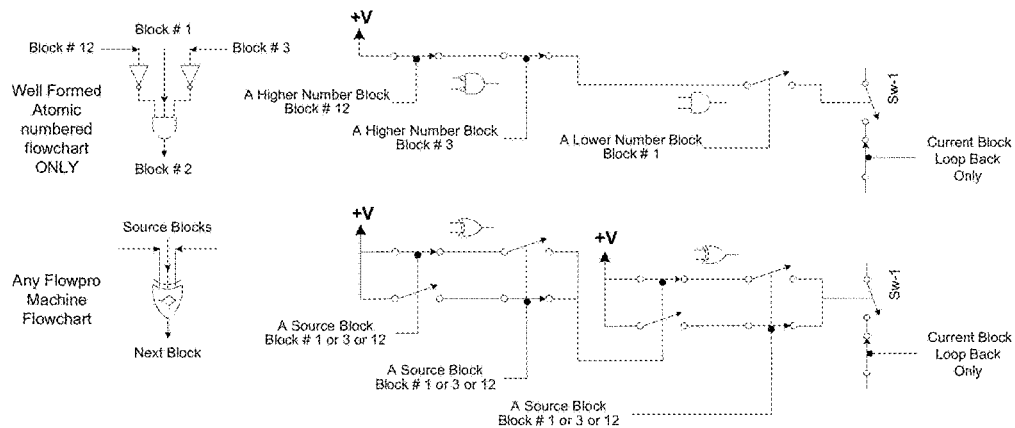

As shown in FIG. 7I, lines on a Flowpro Machine flowchart that go from an Element to a lower numbered Element are referred to as 'loopbacks'. FIG. 7I shows two different implementations of loopback hardware that is used in flowchart "Main" Block #2 between Block #1 and Block #2 of FIG. 7B. The top one of FIG. 7I appears to be more efficient by using less hardware and it does use less hardware but with a caution. Simplification is achieved by knowing that the block numbering of this flowchart is Atomic (all blocks are a higher number than blocks leading to it) so that 'don't care' Boolean conditions can be eliminated.

The well-formed flowchart circuit of FIG. 7B begins when power is applied to the Flowpro Machine flowchart. Before SW-0 is turned ON (flowchart Enable Block function) the Computational Wave output from block #1 will be OFF or 0 Volts (0V) and both 'loopbacks', Blocks #12 and #3, are both OFF or 0V. Recall that a Computational Wave is never static once it has begun propagating through the chip fabric, so a loopback is always executing somewhere unless the flowchart is designed to terminate itself. When the Wave exits Block #1 and arrives at the AND gate the Wave will propagate into Block #2 because the AND gate loopback inputs are both ON or +V because of the two inverters. If the Wave propagates through Block #2 and through Block #3, the Wave (+V) will also propagate through the inverter and become an OFF at the AND gate input. This will turn OFF the Wave into block #2 which in turn will propagate an OFF through the flowchart path just taken. This then causes the propagation of the Wave out of the AND gate to turn ON again and the whole process is repeated until the flowchart Computational Wave moves on to a different Atomic Path.

Figure 12:
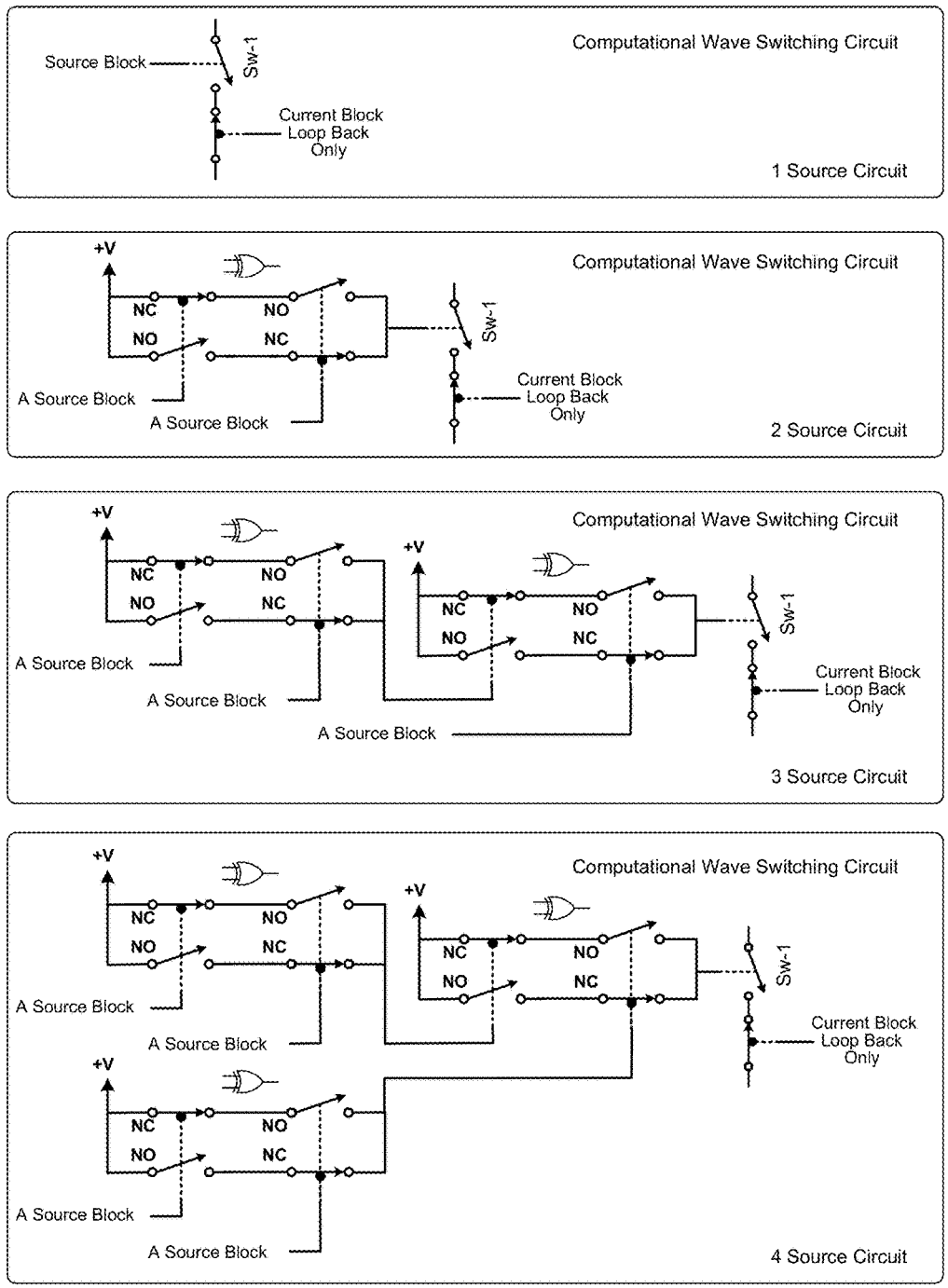
FIG. 12 is an illustration of four computational wave switching circuits, in accordance with an exemplary embodiment of the disclosure.

The bottom circuit of FIG. 7I which uses exclusive OR functions requires more hardware, but it will handle a poorly formed flowchart (see FIG. 12). A poorly formed Flowpro Machine flowchart that is simulated on a Turing machine may not behave exactly as that same Flowpro Machine flowchart being executed on a chip.

Flowpro Atomic Time

The concept of Atomic Time has always been a part of a Flowpro Machine, but the quantifying of that concept is a recent innovation. Earlier Flowpro Machines were simulations on Turing Machines and this is where the concept of Atomic Time was first observed. Atomic Time is a parameter that sets maximum time allowed to execute any traversable Atomic Path on any flowchart. By definition, an Atomic Path is any sequence of flowchart Elements that are in ascending order, even though the logic of the flowchart may dictate that a path can never be traversed or executed. Atomic Time assumes that the flowchart is well formed and numbered in an Atomic fashion, which is that every flowchart Element is of a higher number then all elements leading to it.

Figure 13:
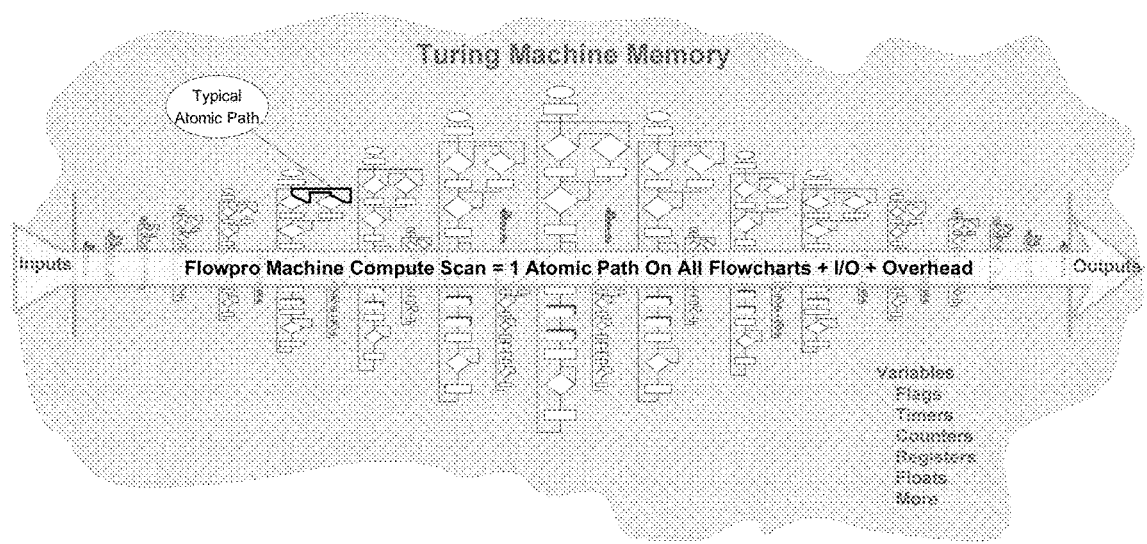
FIG. 13 is an illustration of a Turing Machine simulation of a Flowpro Machine, in accordance with an exemplary embodiment of the disclosure.

As shown in FIG. 13, Atomic Time is important to the visualization of Flowpro Machine Elements on flowcharts but more importantly, Atomic Time is related to the responsiveness or throughput of the parallelized computational system shown in FIG. 13. In a Flowpro Machine we refer to throughput as Scan Time. As Scan Time goes down throughput goes up. A system that has an average Scan Time of 0.001 seconds has 10 times the throughput of a system that has an average scan time of 0.01 seconds. Scan Time is equal to the Logic Solve time of all flowcharts in addition to the I/O update time and other overhead functions such as maintaining timers and counters. Scanning is continuous and cannot be interrupted by a Flowpro Machine application Flowpro Machines in the Chip are truly parallel and therefore Scan has a slightly different definition which will be discussed later. Flowpro Atomic Time was first referred to in the U.S. Pat. No. 9,000,185 "Analytic Engine to Parallelize Serial Code" by Ron Lavallee and Thomas Peacock.

The Flowpro Machine in FIG. 13 is made up of approximately 25 flowcharts or what could be considered 25 separate Flowpro Machines. A Flowpro Machine is a parallel system, so to an observer observing the operation of all 25 Flowpro Machines assumes that they are all happening 'at the same time'. In reality there is only one processor in this Turing Machine, so all 25 Flowpro Machine flowcharts will need to use the CPU for approximately ¹⁄₂₅ of the time that the entire computational system needs for a Scan. This coupled with the fact that Inputs and Outputs are static to an outside observer while the Logic Solve is going on, is what makes a Flowpro Machine simulation on a Turing Machine a parallelized environment. Because each flowchart runs (executes) as fast as it can, allocating a fixed ¹⁄₂₅ of the scan time to each flowchart is inefficient since a portion of the 25 flowcharts will not need a full ¹⁄₂₅ of the Scan Time on any given scan. The Flowpro Machine Turing algorithm overcomes this inefficiency by executing an Atomic Path until the next block is of a lower number than the current block. This switches the Turing processor to executing (running) the next flowchart and the same algorithm is repeated. With this algorithm each flowchart only uses the amount of time that it needs. Although this algorithm has the potential to minimize Scan Tune, it also has the potential to lengthen Scan Time. If a portion of the 25 flowcharts or even a single flowchart has exceedingly long Atomic Paths, or even a long individual Atomic Path, it could affect the overall throughput (Scan Time) of the Flowpro Machine Turing simulation. By Applying an Atomic Time value check to every Atomic Path in the Flowpro Machine, humans and machines (compilers) can identify Atomic Paths that may affect Scan Time and take or suggest corrective action. Our innovation is that this parameter, Atomic Time, can be applied to a Flowpro Machine application to alter parallelism when executing on a Turing machine or natively in parallel on a Chip.

The purpose of an Atomic Time value is to guarantee parallelism within limits, and to uncover more parallelism in a Flowpro Machine in which the initial parallelism is already human conceived. The Atomic Time value parameter guarantees that a Flowpro Turing Machine simulation, and 'ordered' Flowpro Chip Machines, and 'parallel' Flowpro Chip Machines will all exhibit parallelism within a limit that is set by an Atomic Time in each case. All Element execution times must be known in order to use Atomic Time as a limit factor. In a Flowpro Machine all Objects are encapsulations of Atomic functions and once the execution time of Atomic functions are known, then the calculation of object execution time is straightforward but not addressed here. We can use a simple formula that is based on a Scan Time target to arrive at a starting point for an Atomic Time value. And because each flowchart will only execute one Atomic Path on each Scan, we can define an Atomic Path to be equal to a flowchart for scanning or throughput calculation purposes.

Atomic Time and Action Spikes

FIG. 8, Atomic Action Block, refers to an Action Spike that is routed from the Action Block to the Atomic Functions that are to be controlled by that Action Block. The Atomic Time can be used as a lower limit of Action Spike pulse width. A Chip based Flowpro Machine consists of many asynchronous flowcharts running simultaneously each executing one Atomic Path, each within its own Scan. We know from Atomic Time that all Atomic Path execution times are less than Atomic Time, therefore an Action Spike, pulse width greater than Atomic Time ensures that any communication to another flowchart will be seen (accepted) by any other flowchart in the system.

Flowpro Machine Object Transform

As shown in FIG. 14, the Flowpro Machine Transform Engine can transform or restore Flowpro Elements with or without human intervention based on an Atomic Time value and latent flowchart structures. This is important to ensure that the execution of the Flowpro Machine Behavioral Model absolutely matches the visualization of a Flowpro Machine Parallel Model and that the parallelism visualized is maintained across all Flowpro Machines.

Figure 15:
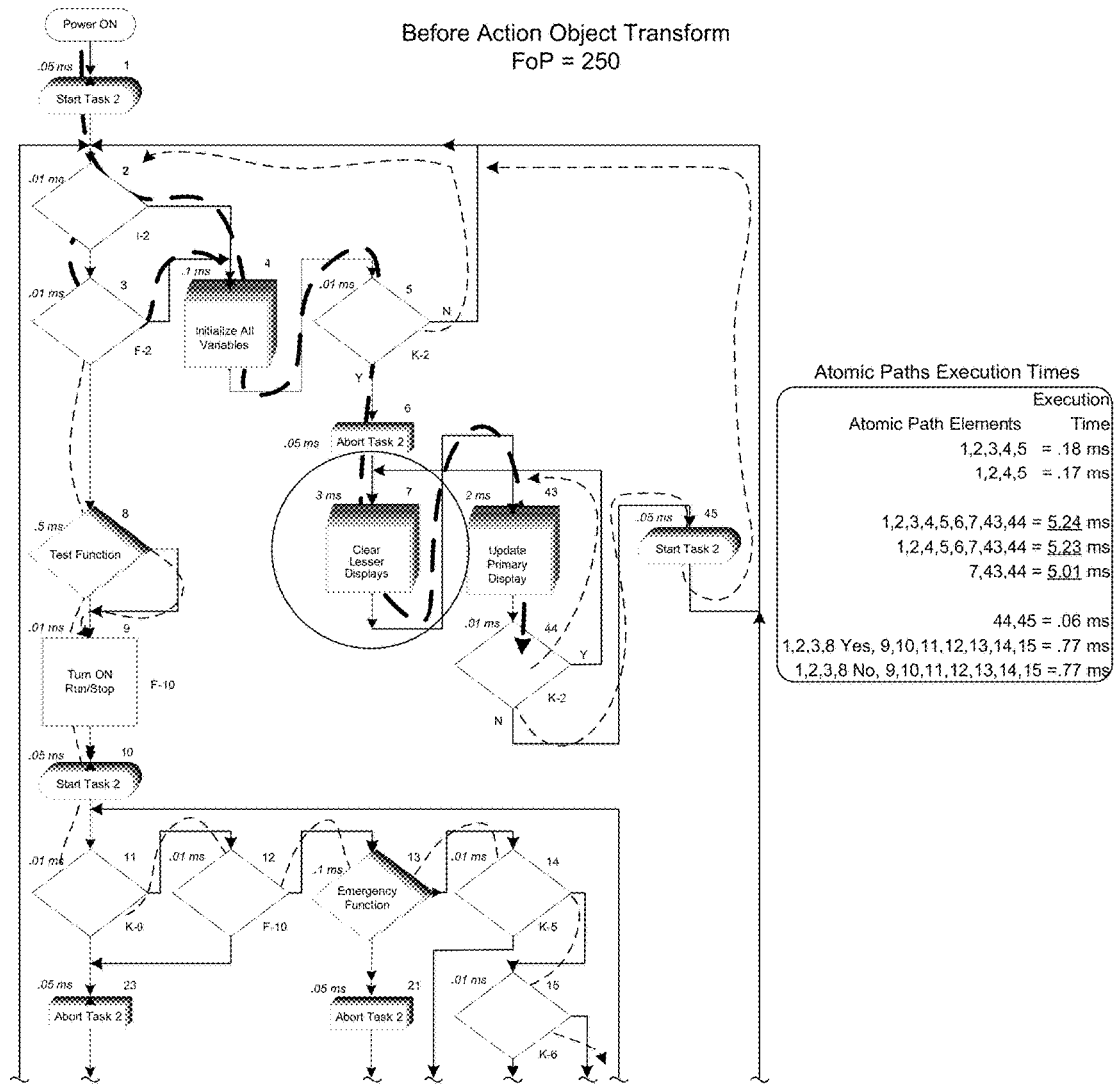
FIGS. 15, 16, and 17 illustrate the Flowpro Machine Object Transform Process.
Figure 16:
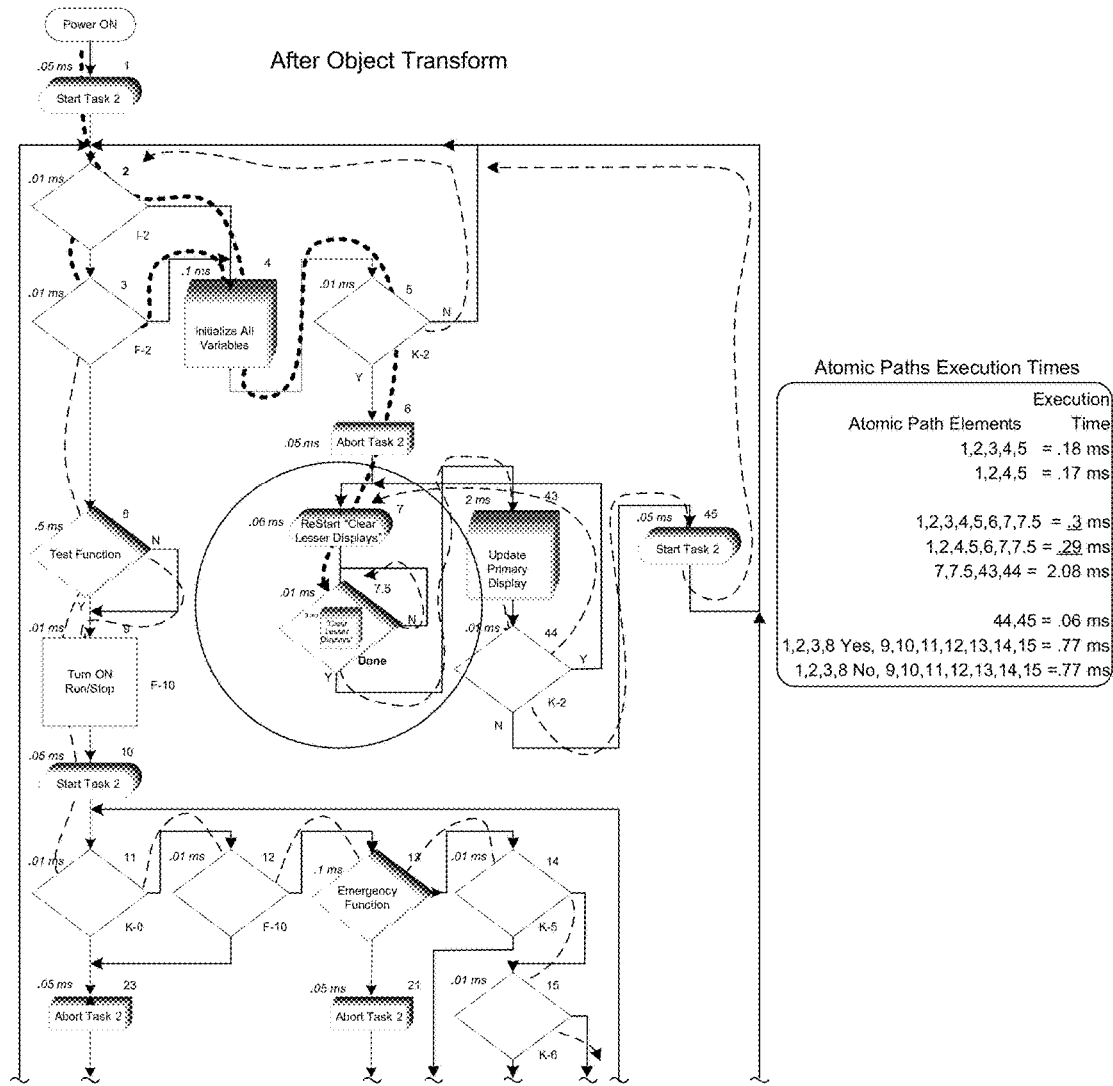
Figure 17:
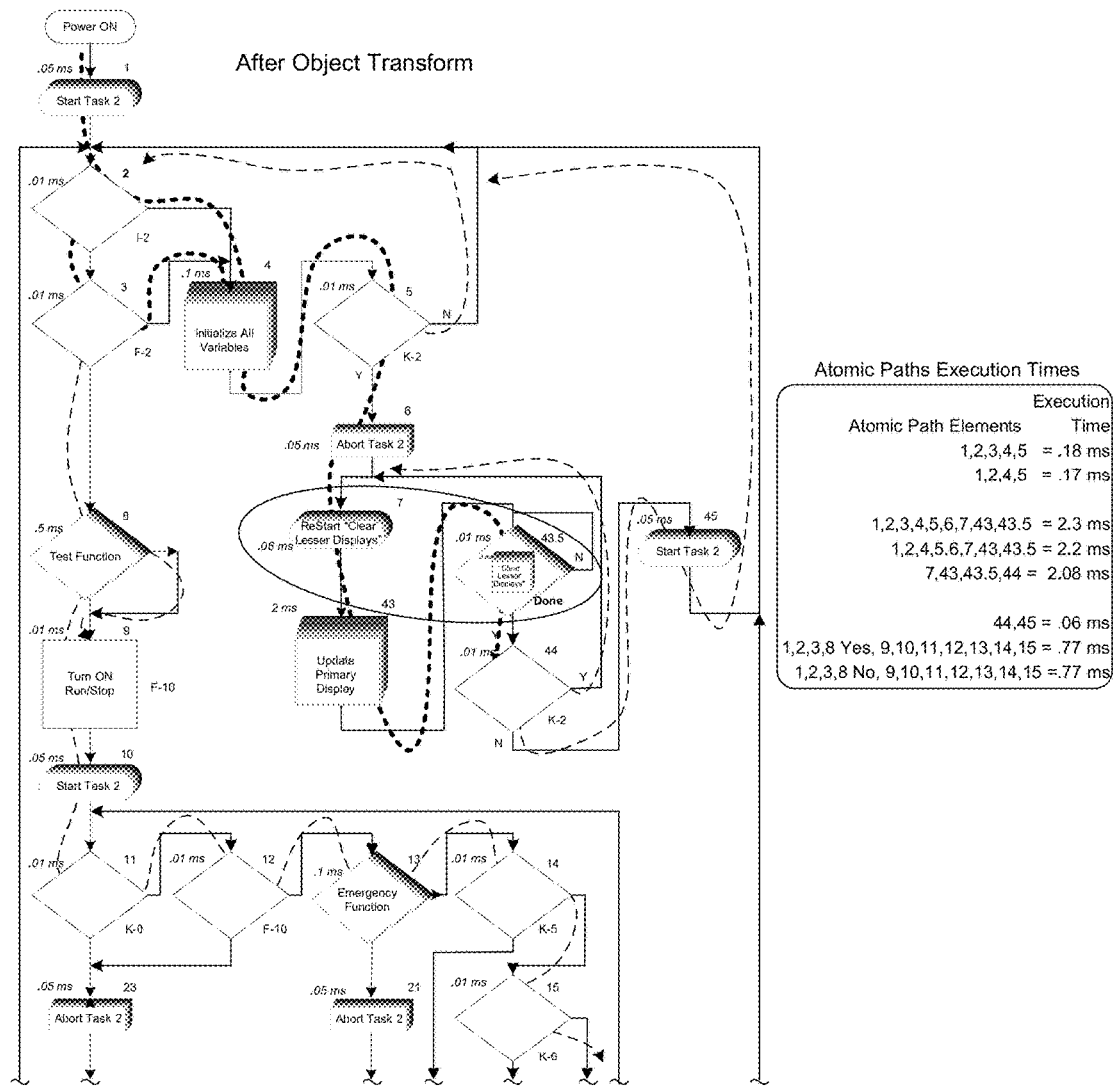

FIGS. 15, 16, and 17 illustrate the Flowpro Machine Object Transform Process. FIG. 15 shows the trial closure calculation of a flowchart. The thin dashed lines show each Atomic Path and heavy dashed lines indicate Atomic Paths with Atomic Time overrun. Each flowchart Element's execution time is shown in milliseconds (ms), along with a corresponding Element number. Execution time of each Atomic Path can be derived for best case, worst case, and average. In FIG. 15 all of the Atomic Path execution times are calculated and shown in the table. Three of the Atomic Paths that transient through elements 7, 43, 44 and 45 exceed the 4 ms Atomic Time that was used. Therefore, an opportunity for parallelism along these paths needs to be found to reduce their transient execution time. The circled Action Object of FIG. 15 is an opportunity for additional parallelism 'by Transform' to a parallel Flowpro Machine, i.e. Task Object.

FIG. 16 illustrates how Action Object #7 of FIG. 15 is transformed into a Task Object (7 & 7.5.), by simply taking the visualization and the software or hardware that executes the Action Object and encapsulating it in a Task Object. This adds a Start and Done Flowpro Machine structure as discussed earlier. The three overrun Atomic Paths execution times are now reduced by approximately 2 ms which will affect Scan Time in one of two ways. If this is a Turing machine simulation of a Flowpro Machine, then the scan time will be slightly longer but all flowcharts every scan meet criteria of our target throughput of 0.1 seconds.

FIG. 17 illustrates how a human using the Flowpro Machine Transform Engine can improve the behavior of a Flowpro Machine model by modifying the flowchart structure. The Done portion of a Task Object structure can be placed anywhere on the calling flowchart, so by rearranging the Elements on the flowchart both Action Object functions will happen in parallel saving actual behavioral time of the system modeled.

Flowpro Machine Structures and Math

As shown in FIGS. 18-21, a Flowpro Machine is a massively parallel Stateless Machine, which can perform mathematical functions without using Boolean, State, or Turing Machine structures, given that the Counter and Adder examples shown are parallel stateless Flowpro Machines. Flowpro Machine math functions have not been implemented at the Chip level, so transistor utilization efficiency is unknown. Flowpro Machines work extremely well with these other computational machines, which have optimized transistor utilization efficiency.

Geo Structures

Figure 18A:
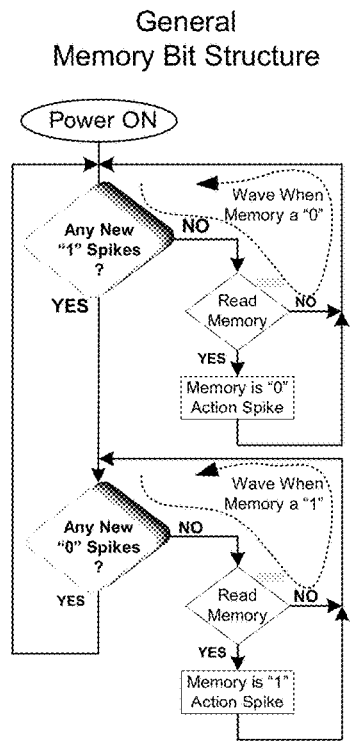
FIGS. 18A-18B are illustrations of Flowpro Machine Geo Memory Structures, in accordance with some exemplary embodiments of the disclosure.

FIG. 18A shows a General Memory Bit Structure, which is a simple structure that is the basis of the four bit counter example and the 32 bit adder example as well as other uses. This "Stateless Memory" remembers Status but not the State of a physical element. Each of these Stateless Memory Bit structures has a Flowchart or Chip fabric geographical location. The geographic location of each Memory Bit's Computational-Wave (C-W) determines the memory Status and the geographic meaning of that Status is user defined. These small Flowpro Machine Structures that generally have a single function are referred to as Geo's.

Memory Bits

The flowchart of FIG. 18A begins execution with Power ON and will C-W (computational wave) at the top of the flowchart, maintaining a Status of "0", and waiting for Action Spikes from any flowcharts that request to represent a "1" of this user defined function. This could be considered a Flowpro Machine Latch function, but, it is referred to as a Geo Memory Bit because of its geographical definition Status. A read input will simply cause a "0" Action Spike or a "1" Action Spike to be generated depending on the position of the C-W. The absence or presence of one of these Action Spikes represents status.

One Time Read Memory Bit

Figure 18B:
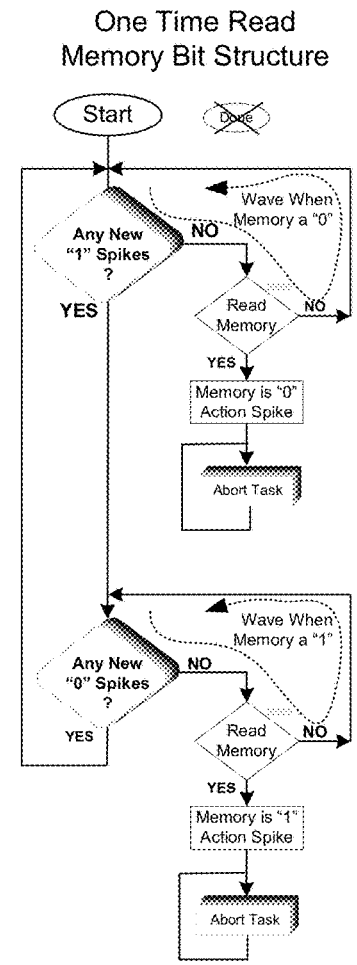

FIG. 18B shows one-time read memory bit structure in which a Task Object is used to implement this memory because of the Abort Task feature. Sometimes security systems require a one-time read of encryption keys. This is an example of how the Abort Task function is used to terminate itself but with the ability to be called again after clearing itself. Hardware simply resets the Computational Wave inside of the Task's Start (enable) function.

Stateless Four Bit Ripple Counter

Figure 19:
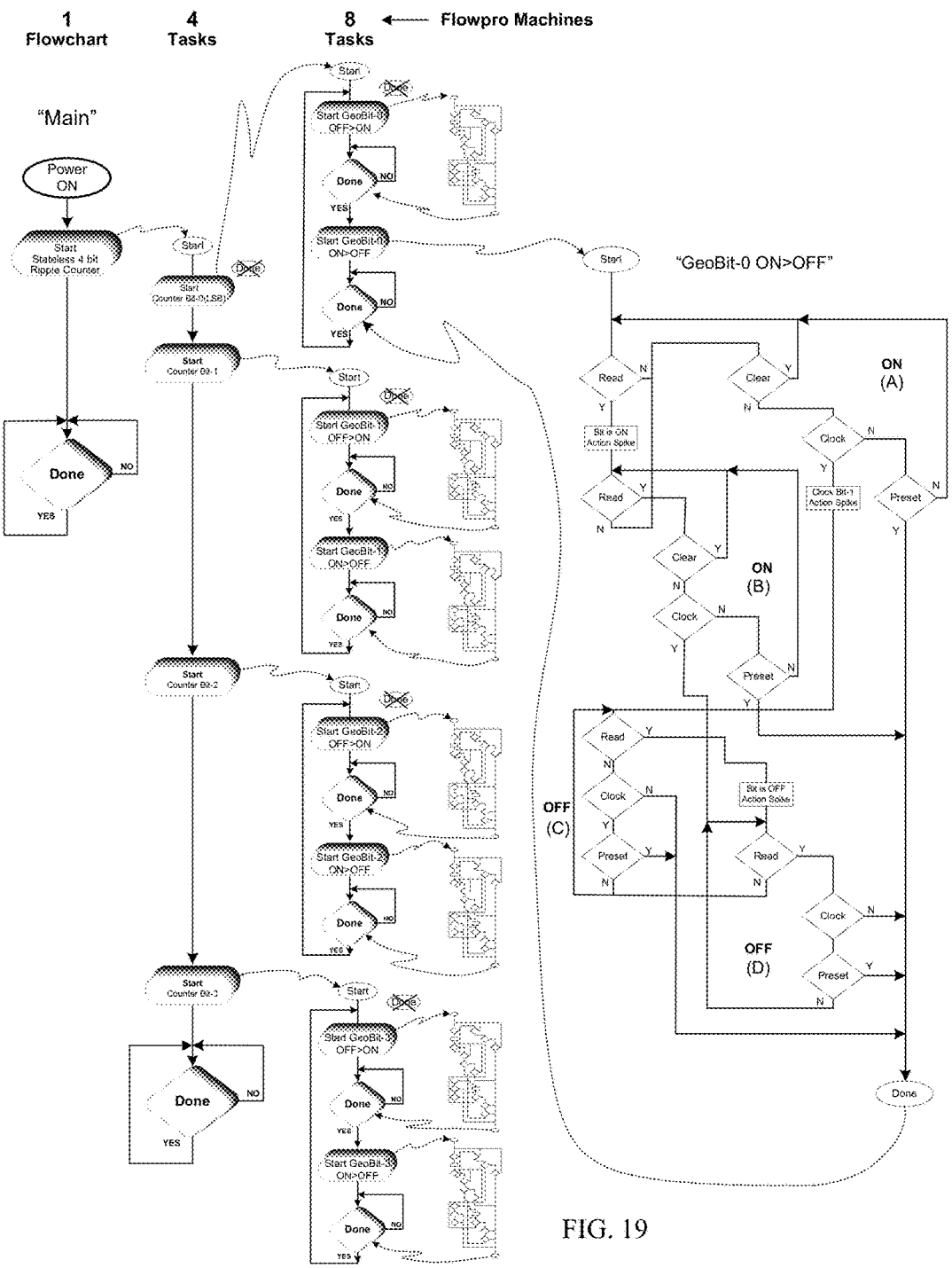
FIG. 19 illustrates thirteen parallel hierarchical Flowpro Machines that act in fashion to create a four-bit Ripple counter, in accordance with an exemplary embodiment of the disclosure.

FIG. 19 shows 13 Flowpro Machines, one Flowchart and 12 Task Objects, that acting in parallel, in a hierarchical fashion, create a four-bit Ripple counter. A Flowpro Machine Flowchart or flowcharts are the top-level control of any Flowpro Machine application. The Power ON Enable Element is only used on a flowchart and therefore only flowcharts can begin operation with Power ON which then can Start (call) Task Objects.

At power ON flowchart "Main" begins executing Task Object "Stateless 4 Bit Ripple Counter", which has a 4 Task Object flowchart structure (Counter Bit-0, Counter Bit-1, Counter Bit-2, Counter Bit-3) encapsulated within it as shown by the 4 Tasks column. The Done Symbol inside of "Stateless 4 Bit Ripple Counter" Task Object is not connected and hence this object once it is started, runs continuously. This is also true for each of the 4 Counter Bit Objects. Even though the Done function of a Task Object is not used the Done status of that object can be tested but will always result in a NO and never a YES. The Done Element becomes a convenient endpoint for the C-W of a Task Object or Objects that are continuously running. The 4 Counter Bit Objects each Start two similar Task Objects, Geo bit-x OFF>ON and Geo bit-x ON>OFF in which the Done function is used. To the right of these 8 Task Objects is the structure encapsulated within each. Each uses two Task Objects to implement its counting function. One Task Object is normally C-W representing a '0' (OFF) or transitioning to a '1' (ON) and the other representing a '1' ON or transitioning to a '0' (OFF). These two objects are continually executed one after another as each becomes Done as shown in GeoBit-0 ON>OFF, the expanded structure. This object begins executing C-W in Geo region (A) representing a "1" (ON) until a Clock event occurs and moves the C-W to OFF (C) representing a '0' (OFF), waiting for the clock pulse to go OFF. When the Clock pulse goes OFF this Task Object becomes Done and the Geo bit-0 OFF>ON Task Object is then Started representing a '0'. Each bit counts independently dependent on its clock event, representing bit status by geolocation, and its status is not a State until it is read.

32 Bit Full Adder

Figure 20:
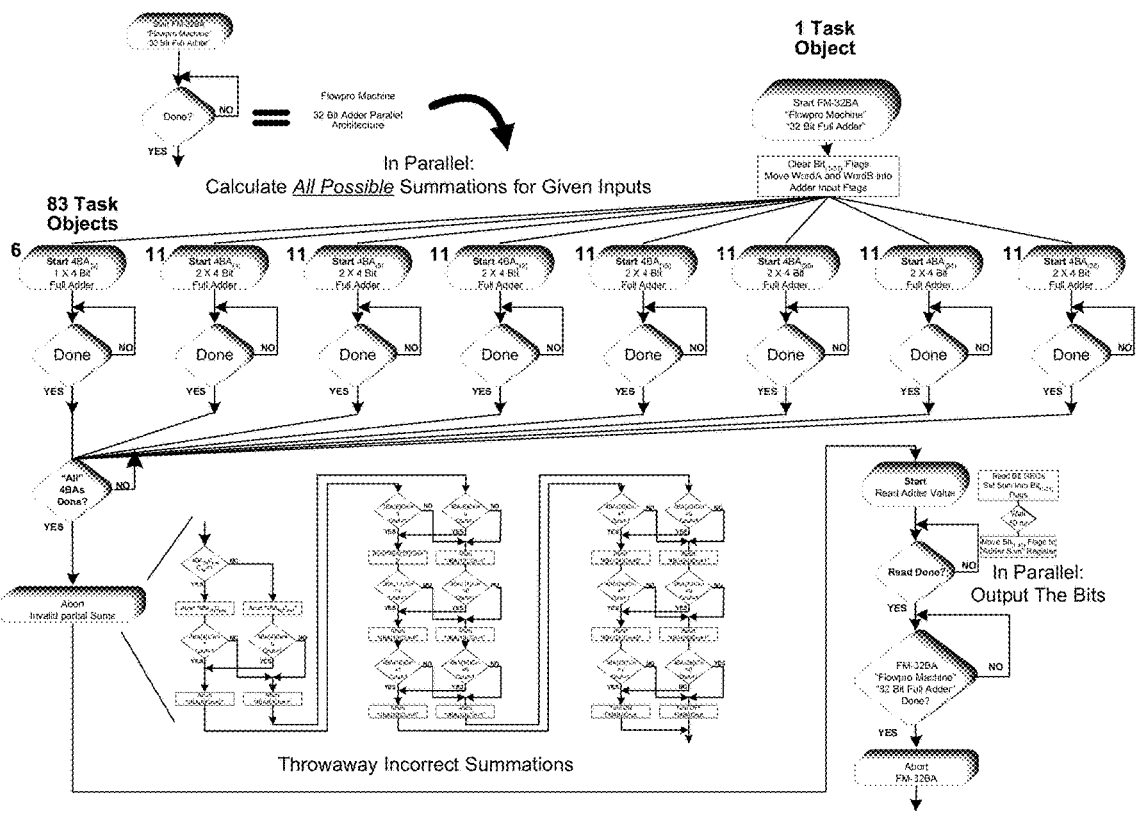
FIG. 20 illustrates eighty-four parallel hierarchical Flowpro Machines that act in fashion to create a 32-bit adder, in accordance with an exemplary embodiment.
Figure 21A:
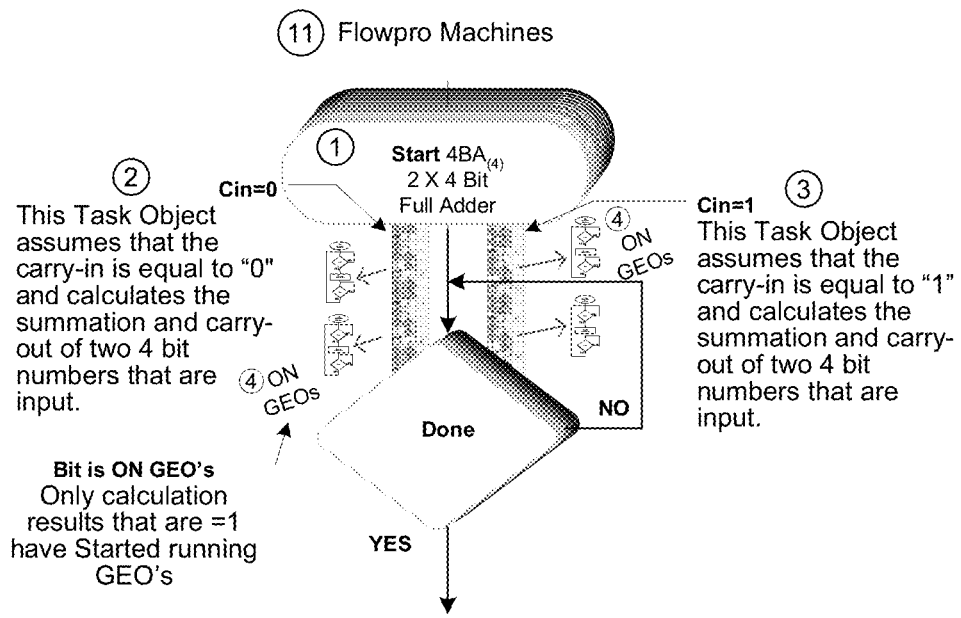
FIGS. 21A-21B illustrate 4-bit adder structures typical for exemplary Flowpro Machines, in accordance with some embodiments of the disclosure.
Figure 21B:
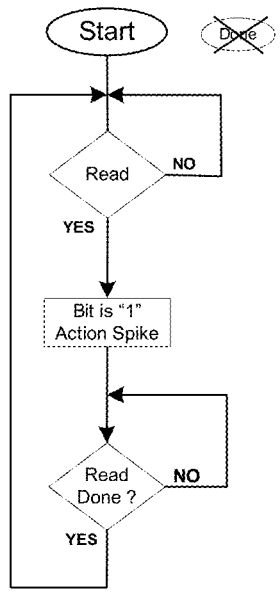

The Flowpro Machine of FIG. 20 is another example of a Flowpro Machine hierarchical parallelism architectural structure. The 32 Bit Full Adder Task Object is implemented using 83 Task Objects within it. This example highlights the advantage of using parallelism to decrease the 32 bit adder addition time. When the 32-Bit Adder begins executing it Starts (calls) the eight 4 Bit Adder Task Objects that in turn each Start two Summation Task Objects. The 2 Summation Task Objects have the potential, depending on summation results, to Start 4 Geo's (see FIGS. 21A-21B). As FIGS. 21A-21B shows there are 11 Task Objects for each 4-bit adder, but that's 5 more than might be needed. We don't know the Carry-in to each 4-bit stage, so we just calculate them all and discard the ones not needed when we know the results from the Carry-out of the $1^{st}$ stage. The central portion of FIG. 20 shows the logic of discarding (Abort) 4 Bit Adder's that are not relevant to the current addition. The advantage of Flowpro Machine parallelism at the Chip level has yet to be fully exploited but what is known is that the ability to add and remember is the ability to calculate, anything a human can calculate.

Advantages of a Flowpro Machine

Accuracy

A Flowpro Machine is a new device, so all of the advantages of Flowpro Machines are unknown at this point. What is known at this point, is that attributes of Chip based Flowpro Machines alone indicate that there are advantages to be fostered. Referring to FIGS. 1A-1B, a block diagram of the Flowpro Machine Computational Engine, an obvious advantage that it shows is that the Engine uses one language, flowcharts, to model from human conception of system requirements to implementation of circuits within Chips. A Flowpro Machine model can represent all levels of abstraction of any discrete process for any domain and can transfer that human conceived knowledge to a Machine, a Chip. A single modeling language will result in higher accuracy in translating Human Intelligence to Machine Intelligence Atomic Ordering Algorithm The Atomic Ordering employed by the disclosed systems can provide optimal numbering for Atomic Paths on well-formed flowcharts. It attempts to localize Element (block) numbers for readability by selecting from nearby non-numbered Elements when selecting Element paths to number. For NON-well-formed flowcharts, this method will highlight paths that may need to be re-drawn to accomplish maximum atomic execution. Note that the terminology used for referencing flowlines designates the block (Element) from which the flowline starts as the source and the terminus of the flowline as the destination. Also note that the basic tenet of numbering is to not number a block until all of its sources have been numbered, with the one exception for loop-backs which occur when a sourcing block may only be reached by passing through the block being evaluated for numbering.

Figure 22:
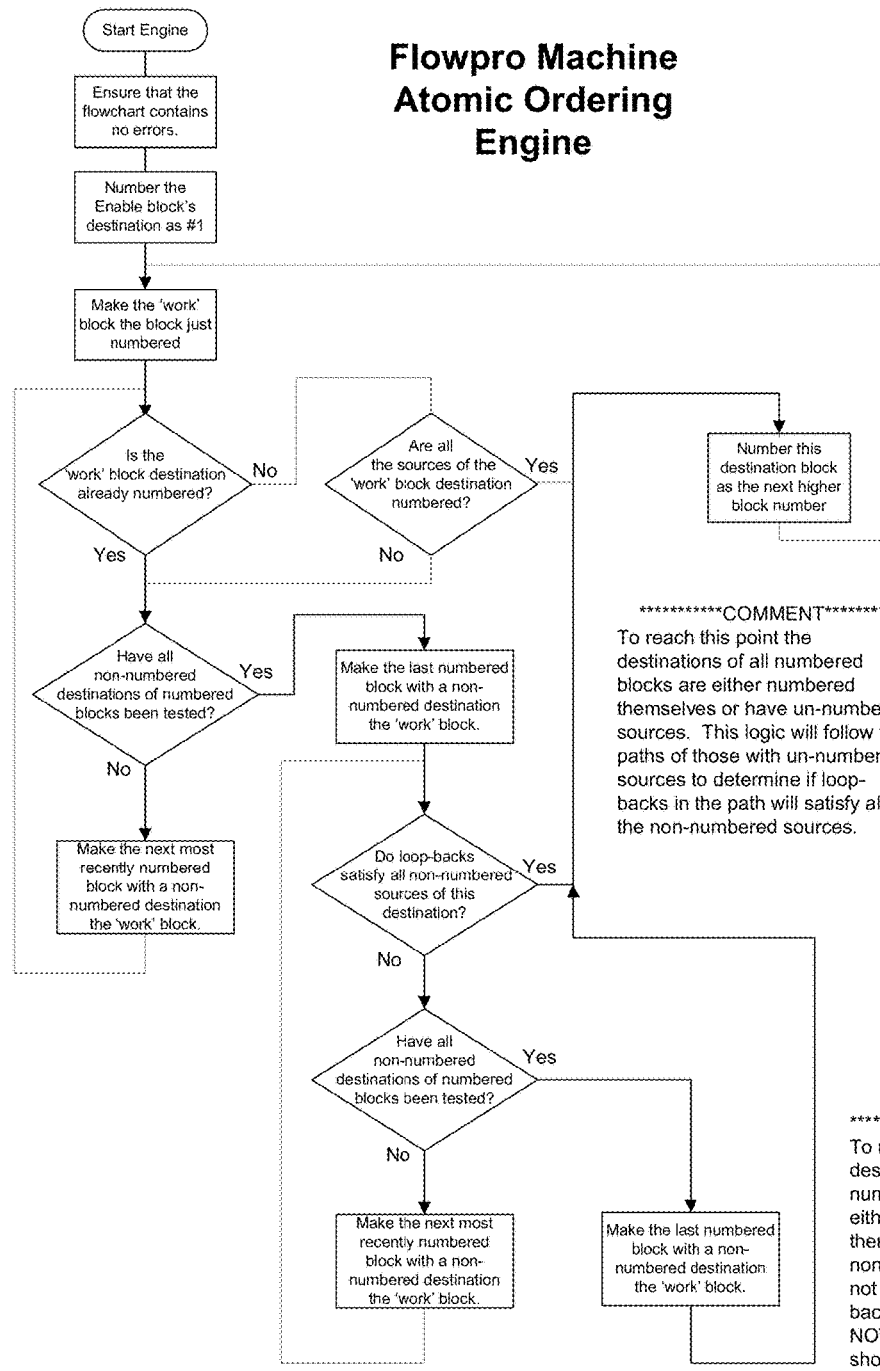
FIG. 22 is an illustration of a Flowpro Machine Atomic Ordering Engine, in accordance with an exemplary embodiment of the disclosure.
Figure 23:
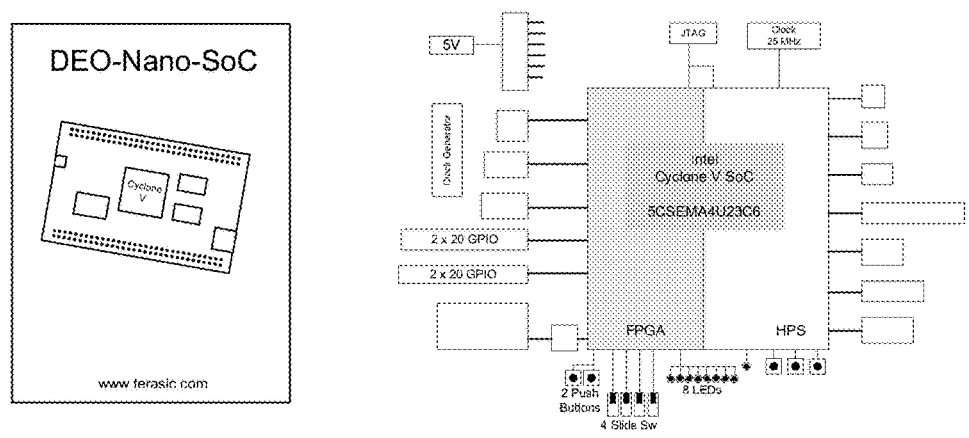
FIG. 23 is an illustration of Intel FPGA hardware used to test Flowpro Machines, in accordance with an exemplary embodiment of the disclosure.

Preliminary Steps (See FIG. 22)

Ensure the flowchart is error-free, i.e. all destination blocks are specified. Enumerate all the sources to each destination block for subsequent reference. Create an empty list which will store references to all 'non-numbered blocks' which have a numbered source as the algorithm progresses. Number the destination of the 'Enable' as block number 1 and call it the WORK block. Proceed to LOOP_1. Note that although there may be sources other than the 'Enable' for this block, they would all meet the definition of loop-backs.

LOOP_1

Note that for numbering consistency only, our method always checks and proceeds on the right destination path of a test block first. Also note that if the WORK block entering this point has two destinations, if the bottom destination is NOT numbered, add it to the list of 'non-numbered blocks' for subsequent checking.

If the WORK block's destination is already numbered, proceed backwards through the list of non-numbered blocks until you reach either (1) a block with all its sources numbered or (2) the end of the list. If you find a block with all its sources numbered, remove the block from the list, number the block with the next higher number, call it the new WORK block and begin again at LOOP_1. If you have reached the end of the list proceed to LOOP_2.

If the WORK block's destination is NOT numbered and has NO non-numbered sources, number the destination block with the next higher number, call it the new WORK block and begin again at LOOP_1.

If the WORK block's destination is NOT numbered and has non-numbered sources, add it to the list of non-numbered blocks and then proceed backwards through the list until you reach either (1) a block with all its sources numbered or (2) the end of the list. If you find a block with all its sources numbered, remove the block from the list, number the block with the next higher number, call it the new WORK block and begin again at LOOP_1. If you have reached the end of the list proceed to LOOP_2.

LOOP_2

Note that to reach this point the destinations of all numbered blocks are either already numbered or have non-numbered sources. The logic here will determine if non-numbered sources may be the result of loop-backs.

Proceed backwards through the list of non-numbered blocks performing a PATH_ANALYSIS with each block as the path head until you reach either (1) a block with all its non-numbered sources identified as loop-backs or (2) the end of the list. If you find a block with all its non-numbered sources as loop-backs, remove the block from the list, number the block with the next higher number, call it the new WORK block and begin again at LOOP_1. If you have reached the end of the list proceed to LOOP_3.

PATH_ANALYSIS

In many instances paths need to be identified and analyzed to determine if loop-backs will satisfy non-numbered sources of the 'path head'. This routine returns a YES/NO as to whether all non-numbered sources to the path head are resolved by loop-backs.

Upon entry to this routine a temporary copy of the path head's non-numbered sources should be created. Following the flowlines, as any block on the path is encountered that sources the path head, this temporary list should be modified to eliminate this source since it comes from within the path. If all of the sources in the list become eliminated in this manner, the analysis is stopped and the routine will provide a YES return.

During analysis, anytime a Test block with two destinations is encountered, both destination paths must be followed to complete the analysis. Any individual path's analysis will be considered complete when one of the two following blocks is encountered: (1) a previously numbered block or (2) a block that has already been encountered on any of the path head's analyses. When all path analyses complete before the non-numbered sources are all eliminated the routine will provide a NO return.

Note that if a block is reached that has a non-numbered source and that source has not been already encountered on the path head's analyses, recursively run a new PATH_ANALYSIS with this block as the path head.

LOOP_3

Note that if you have reached this point this is a NON-well-formed flowchart. Highlight the last block in the list of non-numbered blocks each time you arrive at this point, so the designer may re-evaluate the flowchart logic.

For numbering completion purposes, proceed backwards through the list of non-numbered blocks removing the block from the list, number the block with the next higher number, cal it the new WORK block and begin again at LOOP_1. If you have reached the end of the list then all blocks that may execute are numbered. Any remaining blocks are NOT on an executable path.

Flowpro Machine Observed Proof

System Overview

The FC_1_V5 Flowpro Machine of FIG. 26A was created by printing to a pdf file From the Intel (Altera) FPGA design software "Quartus Lite 16.1". The graphic shows three Flowpro Machine flowcharts and the underling circuits used to implement them as an ordered Flowpro Machine or three independent Flowpro Machines. These Flowpro Machines execute in the FPGA fabric without any processor. A Terasic DEO-Nano-Soc development board was used for testing Three slide switches and 2 push button switches on the DEO-Nano FPGA side are used as inputs to the Flowpro Machines. The processor side of the Cyclone V FPGA also has the potential to run the Turing Machine version of Flowpro.

As shown in FIG. 26A, The flowchart block symbols that are around the circuits were drawn freehand using a line tool within the Quartus Lite 16.1 FPGA development system. The circuit documentation has been arranged into flowchart blocks so that the context of the Flowpro Machine can be easily understood. Lines were added to the drawing that represent external wires connecting outputs to inputs of the FPGA fabric. They show a connection from a Flowpro block output to a Flowpro block input. Normally these would be internal connections but the Quartus Lite 16.1 FPGA system rejects this kind of feedback used in an asynchronous design.

Figure 24:
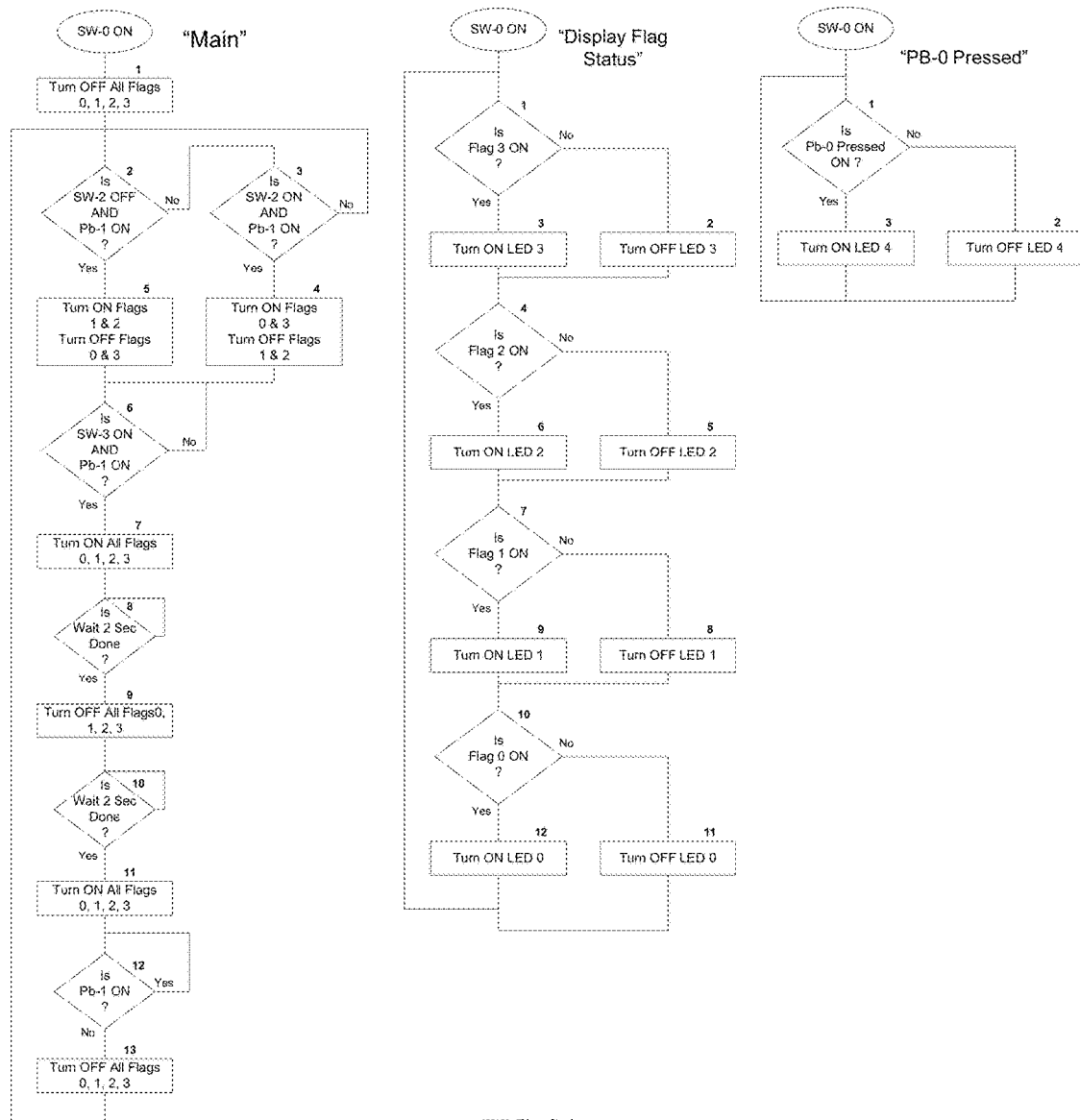
FIG. 24 is an illustration of exemplary flowcharts, in accordance with an exemplary embodiment of the disclosure.

In FIG. 24, Flowchart "Main" tests external switches and sets internal memory (Flags), while flowchart "Display Flag Status" tests Flags (internal memory) and sets external LEDs.

Flowcharts Circuit

Overview and The Computational Wave—We will assume that the reader has some knowledge of what an FPGA (field programmable gate array) is, but for review let's simply state that the device consists of 'fabric', which is pre-configured logic elements that can be programmatically reconfigured and assembled to form user defined logical functions. Each user defined logical function can be independent and therefore FPGAs are inherently parallel.

Some FPGAs, in our case an Intel Cyclone V SOC, also has an ARM Processor integrated with the 'fabric' in the chip. The ARM processor is a Turing Machine that can simulate a Flowpro Machine.

All Flowpro Machine flowchart Elements are ordered (numbered sequentially) with the Atomic Ordering Engine built-in to the Flowpro Compiler. Once a flowchart is ordered, two important Flowpro definitions, Atomic Path and Atomic Time, are then defined as parameters within a Flowpro Machine. An Atomic Path is groupings (sequences) of flowchart Elements that have only ascending Element numbers. There usually are many Atomic Paths on a flowchart but a flowchart can be drawn with only one Atomic Path. The Atomic Time is the maximum time allowed for execution of any Atomic Path. This is what determines the visualization and execution of parallelism In a Flowpro Machine.

The execution of a flowchart, especially in hardware, can be thought of as a 'Computational Wave' that is moving throughout the flowchart (the substrate). This wave starts when the flowchart Enable is true and will move from Atomic Path to Atomic Path as the events described by the flowchart dictate. As the wave is traveling functions are performed—always within the Atomic Time. The wave can be electrons or perhaps photons.

A Flowpro Machine execution begins with a signal, a Computational Wave that is an output out of the Enable block and an input to the first Element of the flowchart. This signal stays ON as long as the Enable is true, bearing in mind that an Enable can be a Boolean function. The Computational Wave is the signal that travels along the flowchart (the substrate) at propagation delay speed and remains ON as the flowchart moves from Atomic Path to Atomic Path. When the signal is input to the first block of an Atomic Path, the signal will remain ON while traversing the numbered blocks in that Atomic Path, which by definition are in ascending order. When the flowchart loops back to a lower numbered block the 'signal' for the Atomic Path just traversed will turn OFF at propagation delay speed. Once the Atomic Path signal (Computational Wave) is OFF the signal turns ON again and the Computational Wave travels the Atomic Path again. This process of the signal ON and OFF repeats until the flowchart moves to the next Atomic Path.

Flowpro Machines are naturally asynchronous graphs that react to asynchronous events in an asynchronous manner and are not based on 'state'. Flowpro Flowchart Machines are also 'stateless'. Most current hardware design is 'stateful' and often uses Finite State Machines to sequence the control and data logic. Stateful hardware design almost always uses a synchronous approach to the implementation. This approach synchronizes logic determination to a Master clock edge. FPGA development tools including the Quartus Lite 16.1 FPGA system promote and enforce a synchronous approach to hardware design through optimization and other synthesizing techniques. Therefore, in this first ever 'reduction to practice' of a Flowpro Machine in hardware, the FC_1_V5 Flowpro Machine shown in FIG. 26A required use of external feedback wires to fool the synthesizer. The Flowpro Machine circuits shown on FIG. 26A use an asynchronous approach with a 'clock driven' implementation that is described below. FIG. 26A includes sections 300, 302, 304, and 306, described in detail below with respect to FIGS. 26B-26E.

FC_1-V5 Flowpro Machine Schematic Key

FMF-Flowpro Machine Flowchart—now simply referred to as a FM or Flowpro Machine

Figure 26B:
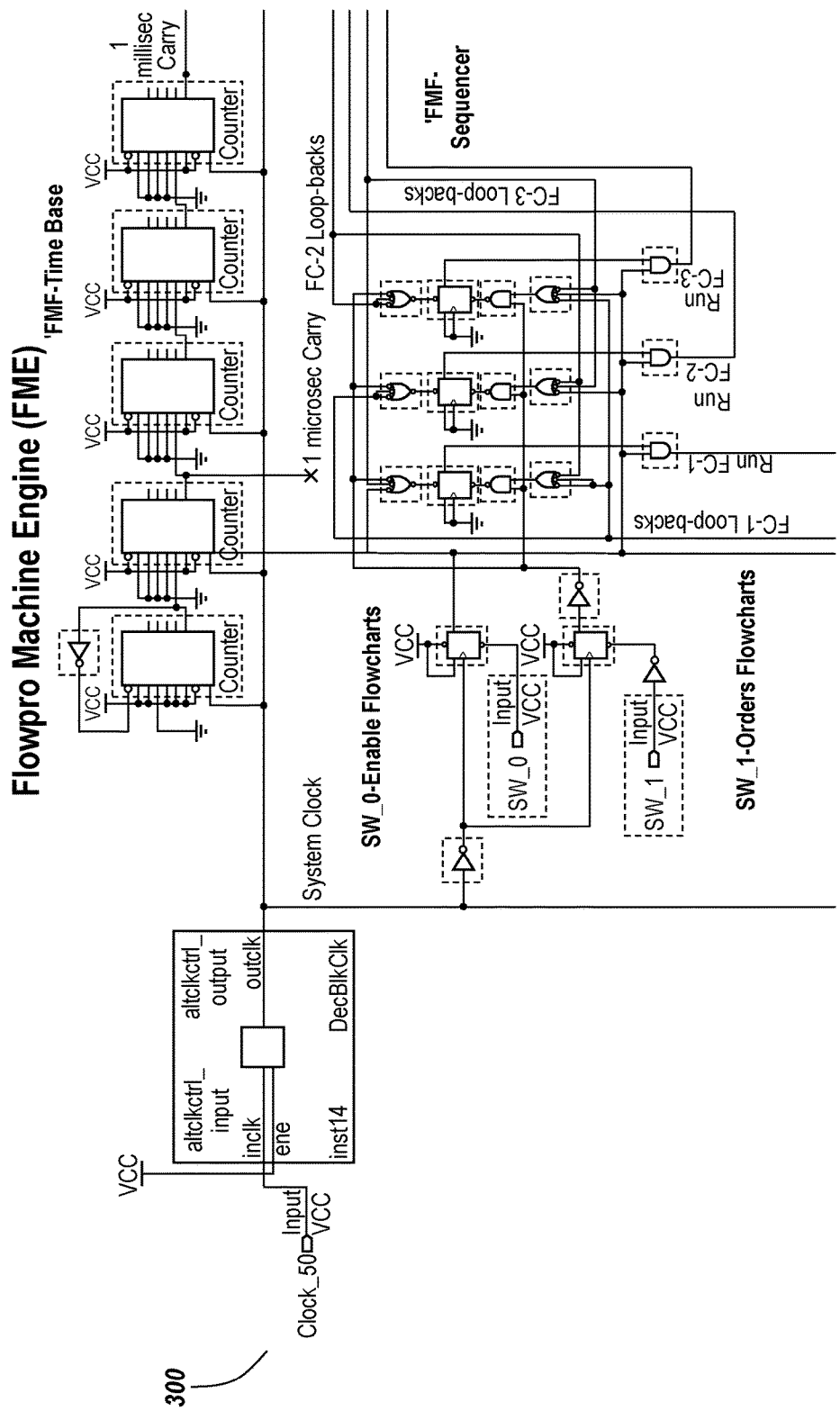
FIGS. 26B-26E illustrate close-up sections of the exemplary FC_1_V5 Flowpro Machine shown in FIG. 26A.

FM-Engine in section 300 of FIG. 26B refers to a Chip region that the Flowpro Machine generates its Clocks, Time Base and Sequencers for all Flowpro Machines FM-Time Base develops a central one microsecond and one millisecond clocks that are used by all Flowpro Machine Atomic Wait Blocks.

FM-Sequencer—is used to 'order' a group of flowcharts, which is three in this case. Ordering means executing one Atomic Path in each Flowpro Machine flowchart in a round robin fashion. Switch SW_1 ON (0V) will enable ordered execution of the three flowcharts and SW-1 OFF (VCC) runs the flowcharts as three parallel Flowpro Machines.

FC-1 Loop Back is the logical OR of all of the Atomic Path loop backs of flowchart "Main."

FC-2 Loop Back is the logical OR of all of the Atomic Path loop backs of flowchart "Display Flag Status."

FC-3 Loop Back is the logical OR of all of the Atomic Path loop backs of flowchart "PB_0 Pressed."

Flowpro Machine Engine (FME)—Clocks, Wait Time Base, Flowchart Group Sequencer

The Enable Block—External switch SW_0 is used to enable execution of all Flowpro Machine flowcharts. Because the hardware design is partially synchronous, a master clock is developed from a 50 MHz external source and is routed to all blocks on the flowchart. The Run FC line is controlled by the Sequencer and is ON and OFF as the Sequencer round robins each Atomic Path in each flowchart. This line is ON when the flowcharts are not ordered. Test Point-GPIO_1-33 is the Atomic Paths FC_1_V5 Loop Back That Is Used by the Sequencer. As per all Flowpro Machines, disabling a flowchart does not turn off outputs. How those outputs are handled is up to the user application.

Atomic Blocks General Structure—The input and re-timing of the wave signal is structurally the same for both and Action or Test block. The number of inputs from both lowered numbered or higher numbered blocks will change from block to block but the input structure remains the same. The output structure is dependent upon the block type. In the case of a 'Wait' Test block (i.e. is wait time done?) only the YES wave signal is propagated to the next block. This is a long standing Flowpro rule.

As shown in FIG. 25, Action Blocks (rectangles)—The structure of all the Action blocks is the same but what action they each perform is determined by the wiring of the Action Spike pulse. When the asynchronous 'Computational Wave' signal enters an Action block it is retimed with the master clock and the three D-flip-flops to produce an Action Spike that is at least two clock period in pulse with. This Spike is then routed to Turn ON or Turn OFF the appropriate flip-flops that hold Flag status or flip-flops that hold LED status. Flowchart "Main" controls flags according to the flowchart logic and flowchart "Display Flag Status" checks each flag (tests) and turns ON or OFF the appropriate LED to match the Flag status. The third flowchart displays the status of PB_0. Notice that the Computational Wave is routed to the next block without waiting for the Action Spike to be generated.

Figure 26C:
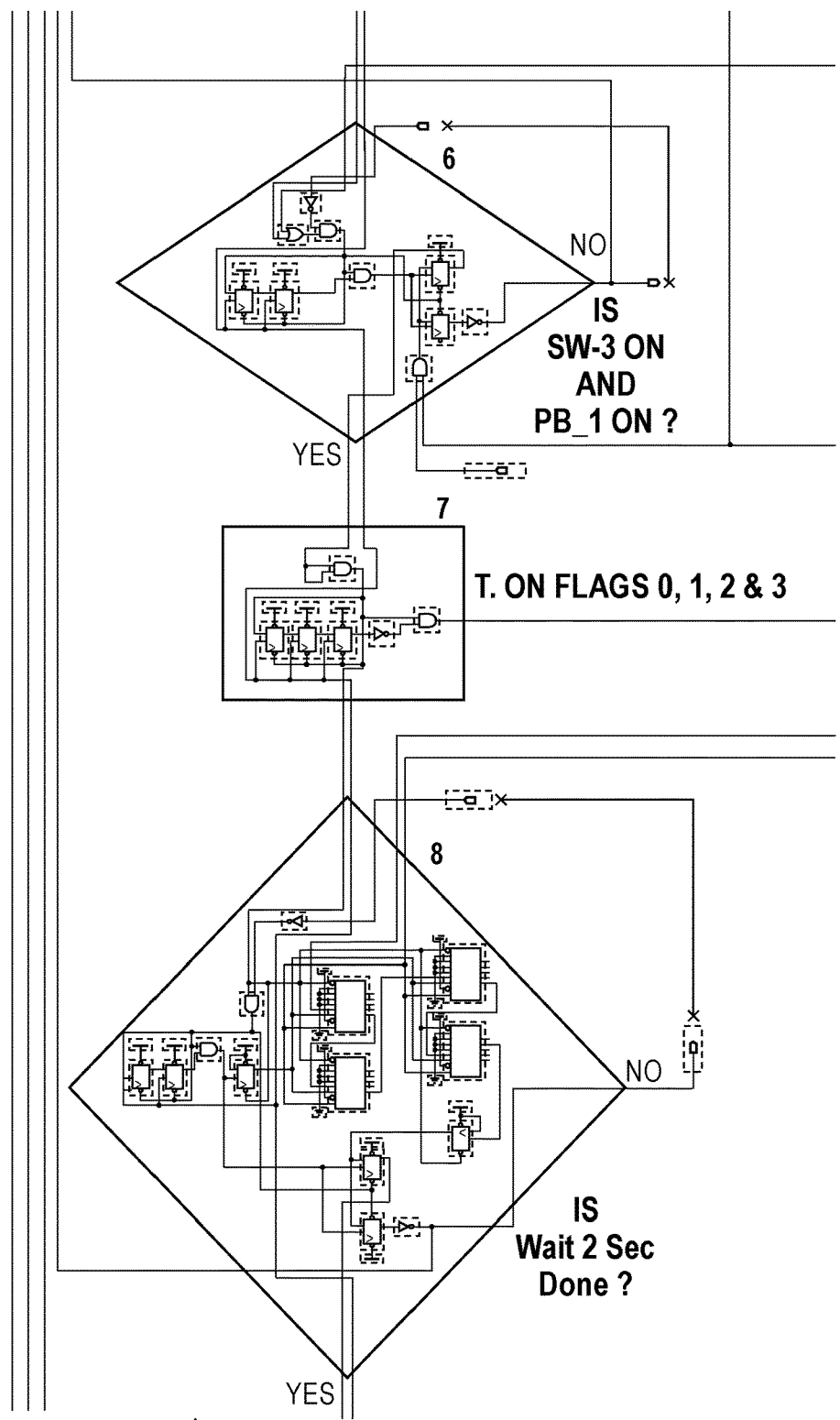

Test Blocks shown in section 302 of FIG. 26C show that without regard to the number of test inputs or the special case of a Wait Test block, all Test blocks are constructed the same with a YES or a NO wave output possible. The test input can be a Boolean expression. In the case of a 'Wait' Test block (i.e. is wait time done?) only the YES wave signal is propagated to the next block.

Figure 26D:
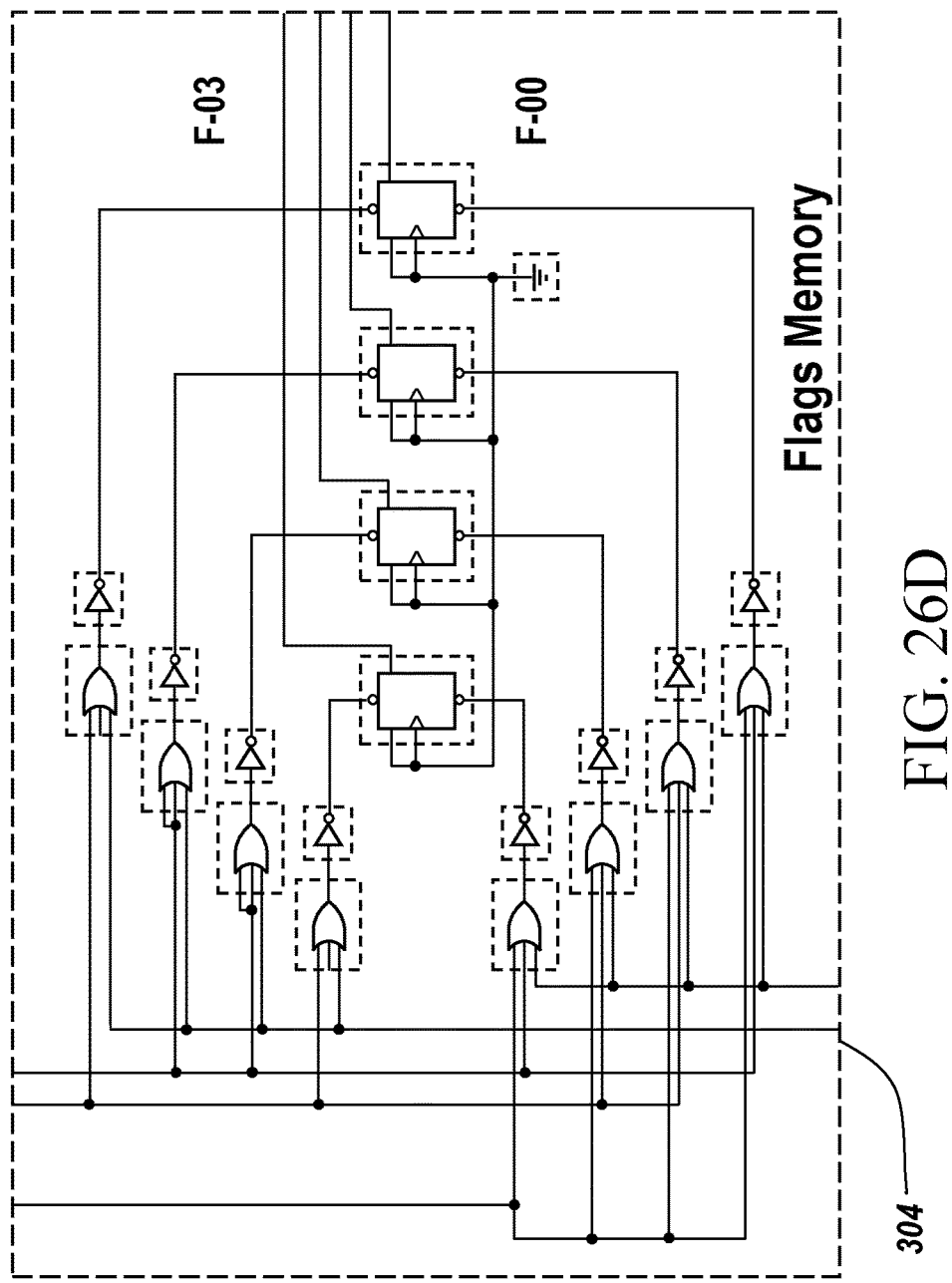

Flags Memory shown in section 304 of FIG. 26D are four flip-flops that hold the status of each flag as each is turned ON or turned OFF by an Action Block in the flowchart "Main". Each flip-flop is preset or cleared by an Action Spike (pulse) depending on the requirements of each particular Action block. Action Spikes are a logical 'OR' into each flip-flop.

Figure 26E:
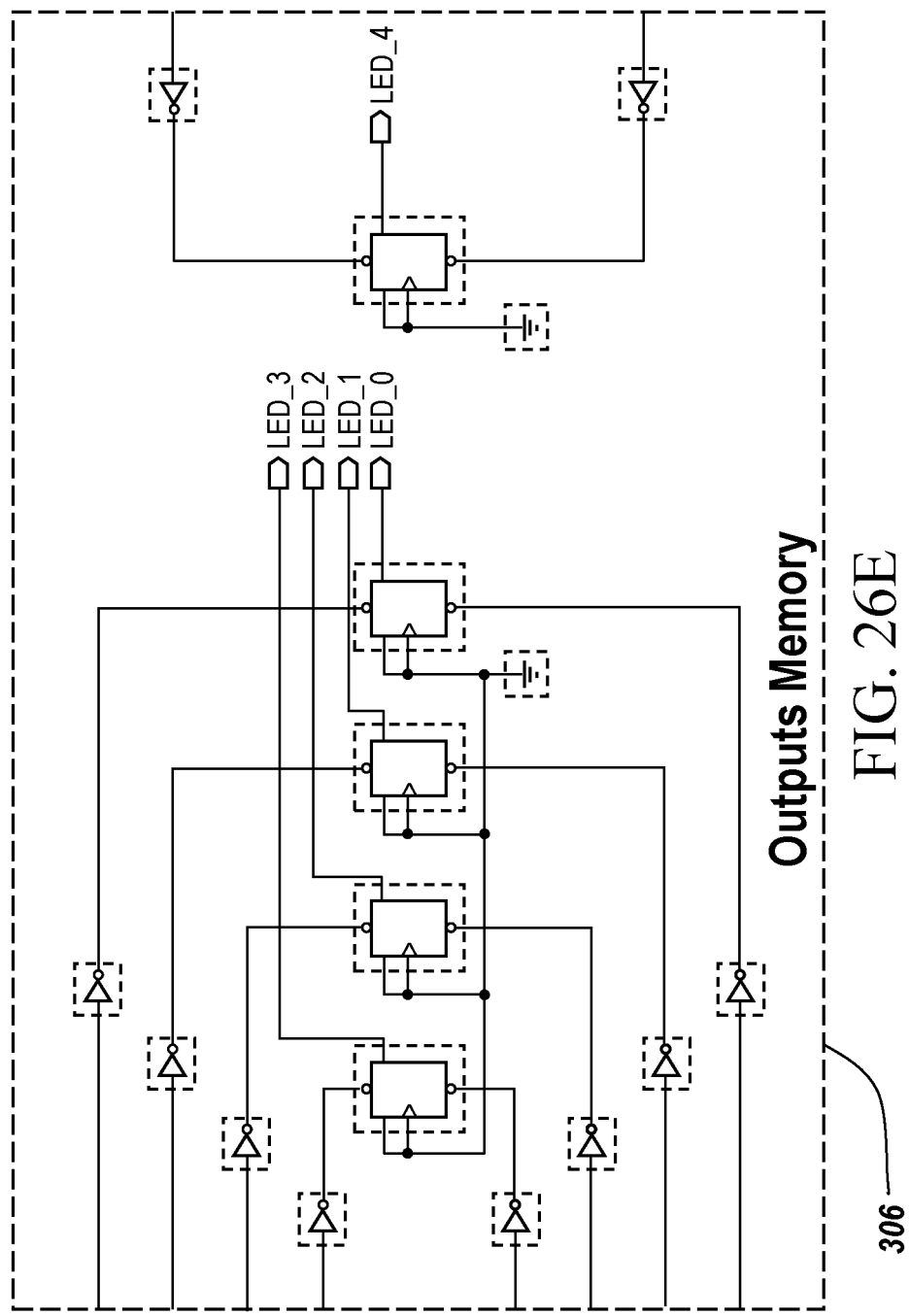

Outputs Memory shown in section 306 of FIG. 26E are four flip-flops that hold the status of each output LED as each is turned ON or turned OFF by an Action Block in the flowchart "Display Flag Status". Each flip-flop is preset or cleared by an Action Spike depending on the requirements of each particular Action block. Action Spikes are a logical or into each flip-flop.

Further Exemplary Methods, Systems, and Devices

Figure 27:
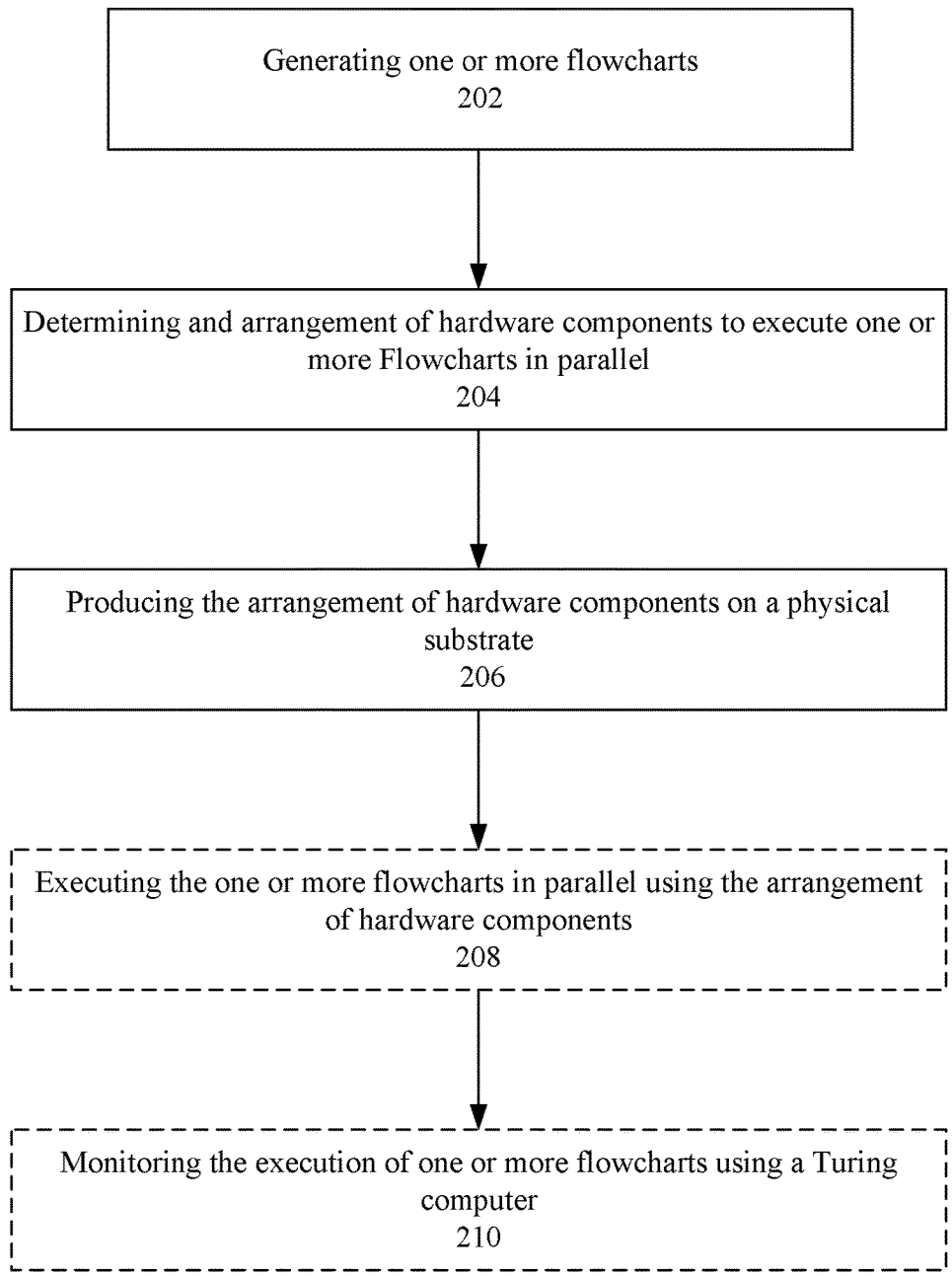
FIG. 27 is a diagram of an exemplary method for designing asynchronous hardware, in accordance with some embodiments of the subject application.

In a first exemplary embodiment, a method for designing asynchronous hardware is provided. This exemplary method 200 is detailed in FIG. 27 and described in detail below. As shown in FIG. 27, method 200 includes generating 202 one or more flowcharts. In some embodiments, the one or more flowcharts generated 202 comprise one or more test objects, action objects, and/or task objects. Method 200 of FIG. 27 continues with determining 204 an arrangement of hardware components to execute the one or more flowcharts in parallel. Method 200 of FIG. 27 continues with producing 206 the arrangement of hardware components on a physical substrate. As will be understood upon review of the subject disclosure, the one or more flowcharts may be encoded graphically or textually with a decision-making processing language. In these and other embodiments, the arrangement of hardware components may be determined by synthesizing the one or more flowcharts according to atomic times associated with the one or more test objects, action objects, and/or task objects. In some such embodiments, the one or more flowcharts may be synthesized to manage computational wave propagations circulating throughout the physical substrate. Depending on intended use and design specifications, the physical substrate may be an integrated circuit chip, a chemical substrate, or a biological substrate. In select embodiments, the arrangement of hardware components includes a chip FPGA or an ASIC. The arrangement of hardware components on the physical substrate may be configured to perform mathematical calculation solutions, in some embodiments. In some such embodiments, the mathematical calculation solutions are configured for artificial intelligence or vector math applications. Method 200 of FIG. 27 optionally includes executing 208 the one or more flowcharts in parallel using the arrangement of hardware components. In these and other embodiments, method 200 optionally includes monitoring 210 the execution of the one or more flowcharts using a Turing computer. In select embodiments, the one or more flowcharts are executed in an order determined during processing In these and other embodiments, the arrangement of hardware components on the physical substrate is configured to transform or restore elements of the one or more flowcharts with or without human intervention based on atomic times associated with the one or more test objects, action objects, and/or task objects of the one or more flowcharts. Numerous configurations and variations are possible and contemplated herein.

In another aspect, an exemplary system for designing asynchronous hardware is provided. In some embodiments, the system includes an input device, a physical substrate, and a monitoring device. The input device may, in some embodiments, include a Turing computer configured to receive graphical or textual input relating to a process defined by one or more flowcharts having one or more test objects, action objects, and/or task objects and to output a synthesized arrangement of hardware components to execute the one or more flowcharts having one or more test objects, action objects, and/or task objects. In some embodiments, the physical substrate may be configured to receive the synthesized arrangement of hardware components. In these and other embodiments, the monitoring device may include a Turing computer in communication with the synthesized arrangement of hardware components on the physical substrate. The synthesized arrangement of hardware components may be determined according to atomic times associated with the one or more test objects, action objects, and/or task objects. In some such embodiments, the synthesized arrangement of hardware components is configured to manage computational wave propagations circulating throughout the physical substrate and/or configured to execute the one or more flowcharts in an order determined during processing. The synthesized arrangement of hardware may, in some embodiments, be configured to transform or restore elements of the one or more flowcharts with or without human intervention based on the atomic times associated with the one or more test objects, action objects, and/or task objects of the one or more flowcharts. In some embodiments, the physical substrate is an integrated circuit chip, a chemical substrate, or a biological substrate. In these and other embodiments, the synthesized arrangement of hardware components includes a chip FPGA or an ASIC. The input device and the monitoring device may be implemented with the same Turing computer or with distinct Turing computers.

In another aspect, an asynchronous computing device is disclosed. The asynchronous computing device may, in some embodiments, include a physical substrate and a plurality of hardware components arranged to execute one or more flowcharts having one or more test objects, action objects, and/or task objects in parallel. In some embodiments, the plurality of hardware components may be configured to execute the one or more flowcharts in an order determined during processing. In these and other embodiments, the plurality of hardware components is configured to transform or restore elements of the one or more flowcharts with or without human intervention based on atomic times associated with the one or more test objects, action objects, and/or task objects of the one or more flowcharts.

The invention claimed is:

1. A method for designing asynchronous hardware, the method comprising:
   generating one or more flowcharts comprising one or more test objects, action objects, and/or task objects;
   determining an arrangement of asynchronous hardware components to execute the one or more flowcharts in parallel; and
   producing the arrangement of asynchronous hardware components on a physical substrate.

2. The method of claim 1, wherein the one or more flowcharts are encoded graphically or textually with a decision-making processing language.

3. The method of claim 1, wherein the asynchronous arrangement of hardware components is determined by synthesizing the one or more flowcharts according to atomic times associated with the one or more test objects, action objects, and/or task objects.

4. The method of claim 3, wherein the one or more flowcharts are synthesized to manage computational wave propagations circulating throughout the physical substrate.

5. The method of claim 1, wherein the physical substrate is an integrated circuit chip, a chemical substrate, or a biological substrate.

6. The method of claim 1, wherein the asynchronous arrangement of hardware components includes a chip FPGA or an ASIC.

7. The method of claim 1, wherein the asynchronous arrangement of hardware components on the physical substrate is configured to perform mathematical calculation solutions.

8. The method of claim 7, wherein the mathematical calculation solutions are configured for artificial intelligence or vector math applications.

9. The method of claim 1 further comprising executing the one or more flowcharts in parallel using the asynchronous arrangement of hardware components and monitoring the execution using a Turing computer.

10. The method of claim 1, wherein the one or more flowcharts are executed in an order determined during processing.

11. The method of claim 1, wherein the asynchronous arrangement of hardware components on the physical substrate is configured to transform or restore elements of the one or more flowcharts with or without human intervention based on atomic times associated with the one or more test objects, action objects, and/or task objects of the one or more flowcharts.

12. A system for designing asynchronous hardware, the system comprising:
   an input device comprising a Turing computer configured to receive graphical or textual input relating to a process defined by one or more flowcharts comprising one or more test objects, action objects, and/or task objects and to output a synthesized asynchronous arrangement of hardware components to execute the one or more flowcharts comprising one or more test objects, action objects, and/or task objects;
   a physical substrate for receiving the synthesized asynchronous arrangement of hardware components; and
   a monitoring device comprising a Turing computer in communication with the synthesized asynchronous arrangement of hardware components on the physical substrate.

13. The system of claim 12, wherein the synthesized asynchronous arrangement of hardware components is determined according to atomic times associated with the one or more test objects, action objects, and/or task objects.

14. The system of claim 13, wherein the synthesized asynchronous arrangement of hardware components is configured to manage computational wave propagations circulating throughout the physical substrate.

15. The system of claim 13, wherein the synthesized asynchronous arrangement of hardware components is configured to execute the one or more flowcharts in an order determined during processing.

16. The system of claim 13, wherein the synthesized asynchronous arrangement of hardware components is configured to transform or restore elements of the one or more flowcharts with or without human intervention based on the atomic times associated with the one or more test objects, action objects, and/or task objects of the one or more flowcharts.

17. The system of claim 12, wherein the physical substrate is an integrated circuit chip, a chemical substrate, or a biological substrate.

18. The system of claim 12, wherein the synthesized asynchronous arrangement of hardware components includes a chip FPGA or an ASIC.

19. The system of claim 12, wherein the input device and the monitoring device are implemented with the same Turing computer.

20. The system of claim 12, wherein the input device and the monitoring device are implemented with distinct Turing computers.

21. An asynchronous computing device comprising:
   a physical substrate; and
   a plurality of asynchronous hardware components arranged to execute one or more flowcharts comprising one or more test objects, action objects, and/or task objects in parallel.

22. The asynchronous computing device of claim 21, wherein the plurality of asynchronous hardware components is configured to execute the one or more flowcharts in an order determined during processing.

23. The asynchronous computing device of claim 21, wherein the plurality of asynchronous hardware components is configured to transform or restore elements of the one or more flowcharts with or without human intervention based on atomic times associated with the one or more test objects, action objects, and/or task objects of the one or more flowcharts.

* * * * *